United States Patent
Chao et al.

(10) Patent No.: US 9,341,483 B2
(45) Date of Patent: May 17, 2016

(54) METHODS AND APPARATUS FOR POSITION ESTIMATION

(71) Applicant: QUALCOMM Incorporated, San Diego, CA (US)

(72) Inventors: Hui Chao, San Jose, CA (US); Saumitra Mohan Das, Santa Clara, CA (US); Eric K. Holm, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 13/794,316

(22) Filed: Mar. 11, 2013

(65) Prior Publication Data

US 2014/0257688 A1    Sep. 11, 2014

(51) Int. Cl.
*G01C 21/28* (2006.01)
*G01C 21/00* (2006.01)
*G01C 21/20* (2006.01)

(52) U.S. Cl.
CPC ............ *G01C 21/005* (2013.01); *G01C 21/206* (2013.01)

(58) Field of Classification Search
CPC combination set(s) only.
See application file for complete search history.

(56) References Cited

U.S. PATENT DOCUMENTS

| | | | |
|---|---|---|---|
| 7,330,112 B1 | 2/2008 | Emigh et al. | |
| 8,098,899 B2 | 1/2012 | Ohashi | |
| 8,131,118 B1 | 3/2012 | Jing et al. | |
| 8,447,273 B1 | 5/2013 | Friedlander et al. | |
| 8,587,670 B2 | 11/2013 | Wood et al. | |
| 2002/0137528 A1 | 9/2002 | Fraccaroli | |
| 2004/0243303 A1* | 12/2004 | Padmanabhan | 701/207 |
| 2007/0219706 A1* | 9/2007 | Sheynblat | 701/200 |
| 2007/0232327 A1* | 10/2007 | Laroia et al. | 455/456.1 |
| 2008/0125078 A1 | 5/2008 | Morimoto | |
| 2008/0273109 A1 | 11/2008 | Bamford | |
| 2010/0023251 A1* | 1/2010 | Gale et al. | 701/201 |
| 2010/0029328 A1 | 2/2010 | Kuo et al. | |

(Continued)

FOREIGN PATENT DOCUMENTS

| | | |
|---|---|---|
| EP | 1897767 A1 | 3/2008 |
| EP | 2503766 A2 | 9/2012 |
| WO | 2011060335 A1 | 5/2011 |

OTHER PUBLICATIONS

Li, X., et al., "Vision-based Positioning with a Single Camera and 3D Maps: Accuracy and Reliability Analysis," Journal of Global Positioning Systems (2011), vol. 10, No. 1, pp. 19-29.

(Continued)

*Primary Examiner* — John R Olszewski
*Assistant Examiner* — James M McPherson
(74) *Attorney, Agent, or Firm* — Silicon Valley Patent Group LLP

(57) ABSTRACT

Systems, apparatus and methods disclosed herein facilitate mobile station (MS) location determination using MS captured images of known points of interest (POIs). In some embodiments, each POI is associated with a corresponding visibility map comprising a set of grid points, and a subset of the POIs may be identified from the MS captured images by matching the MS captured images of each POI in the subset with corresponding stored images. A cumulative grid point weight for a plurality of grid points in the visibility maps associated with the POIs in the subset may be computed. The cumulative grid point weight for each grid point represents the probability that the MS is located at that grid point. The location of the MS may be estimated based on the cumulative grid point weights of the plurality of grid points.

62 Claims, 12 Drawing Sheets

(56) References Cited

U.S. PATENT DOCUMENTS

| | | |
|---|---|---|
| 2010/0125407 A1 | 5/2010 | Cho et al. |
| 2011/0032152 A1* | 2/2011 | Lo et al. .................... 342/450 |
| 2011/0082638 A1* | 4/2011 | Khorashadi et al. .......... 701/200 |
| 2011/0087431 A1* | 4/2011 | Gupta et al. ................. 701/207 |
| 2011/0137561 A1 | 6/2011 | Kankainen |
| 2011/0276266 A1 | 11/2011 | Ballew et al. |
| 2012/0003956 A1 | 1/2012 | Austin et al. |
| 2012/0016872 A1* | 1/2012 | Khorashadi et al. .......... 707/724 |
| 2012/0044265 A1* | 2/2012 | Khorashadi et al. .......... 345/641 |
| 2013/0017842 A1* | 1/2013 | Gupta et al. ............... 455/456.1 |
| 2013/0040600 A1 | 2/2013 | Reitnour et al. |
| 2013/0045751 A1* | 2/2013 | Chao et al. ................. 455/456.1 |
| 2013/0053056 A1* | 2/2013 | Aggarwal et al. .......... 455/456.1 |
| 2013/0238234 A1* | 9/2013 | Chao et al. .................... 701/409 |
| 2013/0308835 A1 | 11/2013 | Thorson |
| 2014/0295887 A1 | 10/2014 | Redfern |

OTHER PUBLICATIONS

Liang, J.Z., et al., "Image Based Localization in Indoor Environments," 2013 Fourth International Conference on Computing for Geospatial Research and Application (COM.Geo), 2013, pp. 70-75.

\* cited by examiner

470

METHODS AND APPARATUS FOR POSITION ESTIMATION

FIELD

The subject matter disclosed herein relates to the determination of mobile station locations.

BACKGROUND

In landmark based positioning systems, the locations of mobile stations (MS) may be estimated based on the known positions of one or more landmarks or points of interest. Landmark based positioning may be useful is situations where Global Navigation Satellite Systems (GNSS) such as the Global Positioning System (GPS) or other network based positioning techniques are less effective. For example, GPS based positioning may not be effective within a building, or in dense urban areas due to signal unavailability, signal losses and/or other factors. Landmark based positioning may also provide an alternate location estimation technique that can be used to increase the reliability and accuracy of location estimates obtained using other techniques.

While landmark based positioning of mobile devices can be useful, the techniques traditionally used with landmark based positioning systems can suffer from inaccuracies in location estimation. Location estimation inaccuracies can potentially increase the disorientation of MS users and may also impair the delivery of other services such as navigation that depend on the location estimation. Therefore, there is a need for systems and methods to enhance the accuracy and reliability of location estimations provided by landmark based positioning systems.

SUMMARY

In some embodiments, a processor-implemented method for estimating a position of a mobile station (MS) may comprise: identifying a subset of Points of Interest (POIs) in a plurality of POIs by matching MS captured images of each POI in the subset with corresponding stored POI images, each POI being associated with a corresponding visibility map comprising a set of grid points; computing a cumulative grid point weight for a plurality of grid points in the visibility maps associated with the POIs in the subset; and computing an estimated location of the MS based on the cumulative grid point weights of the plurality of grid points.

Disclosed embodiments also pertain to an apparatus comprising: a memory configured to store images of a plurality of Points of Interest (POIs) and visibility maps corresponding to the POIs, wherein each visibility map comprises a set of grid points; and a processor coupled to the memory. In some embodiments, the processor may be configured to: identify a subset of POIs in the plurality of POIs by matching MS captured images of each POI in the subset with corresponding POI images stored in the memory; compute a cumulative grid point weight for a plurality of grid points in the visibility maps associated with the POIs in the subset; and compute an estimated location of the MS based on the cumulative grid point weights of the plurality of grid points.

In some embodiments, an apparatus may comprise means for storing images of a plurality of Points of Interest (POIs) and visibility maps corresponding to the POIs, wherein each visibility map comprises a set of grid points. The apparatus may further comprise: means for identifying a subset of POIs in the plurality of POIs by matching MS captured images of each POI in the subset with corresponding stored POI images; means for computing a cumulative grid point weight for a plurality of grid points in the visibility maps associated with the POIs in the subset; and means for computing an estimated location of the MS based on the cumulative grid point weights of the plurality of grid points.

Disclosed embodiments also pertain to non-transitory computer-readable media comprising instructions, which when executed by a processor, cause the processor to: identify a subset of POIs in a plurality of Points of Interest (POIs) by matching MS captured images of each POI in the subset with corresponding stored POI images, each POI being associated with a corresponding visibility map comprising a set of grid points; compute a cumulative grid point weight for a plurality of grid points in the visibility maps associated with the POIs in the subset; and compute an estimated location of the MS based on the cumulative grid point weights of the plurality of grid points.

DETAILED DESCRIPTION

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure.

Landmark based Mobile station location techniques described herein may be implemented in conjunction with various wireless networks, including wireless communication networks such as a wireless local area network (WLAN), a wireless personal area network (WPAN), wireless wide area network (WWAN) and so on.

In referring to the process of determining the location of an MS using a positioning system, the terms location estimation, locating and positioning are often used interchangeably.

The term landmark or "point of interest" (POI) refers to distinct features in the environment around the MS, which may be natural or manmade and may be indoors or outdoors. POIs may include various objects with distinguishing features including structures, kiosks, buildings, storefronts, natural features, signs of various types, such as name boards, office numbers, store signs, billboards, etc. The terms landmark or POI are often used interchangeably. The locations of POIs may be known in advance and stored along with maps, including visibility maps of and/or related to the POI, images of the POIs and distinctive features of the POIs identified in the stored images.

Typically, the pose, which is the position and orientation of the MS relative to one or more known landmarks, may be used to estimate the location of the MS. When optical sensors such as cameras on or coupled to mobile stations are used, the position of the MS can be estimated based on the identification of known landmarks in images of the environment around the MS taken by the camera.

Figure 1:
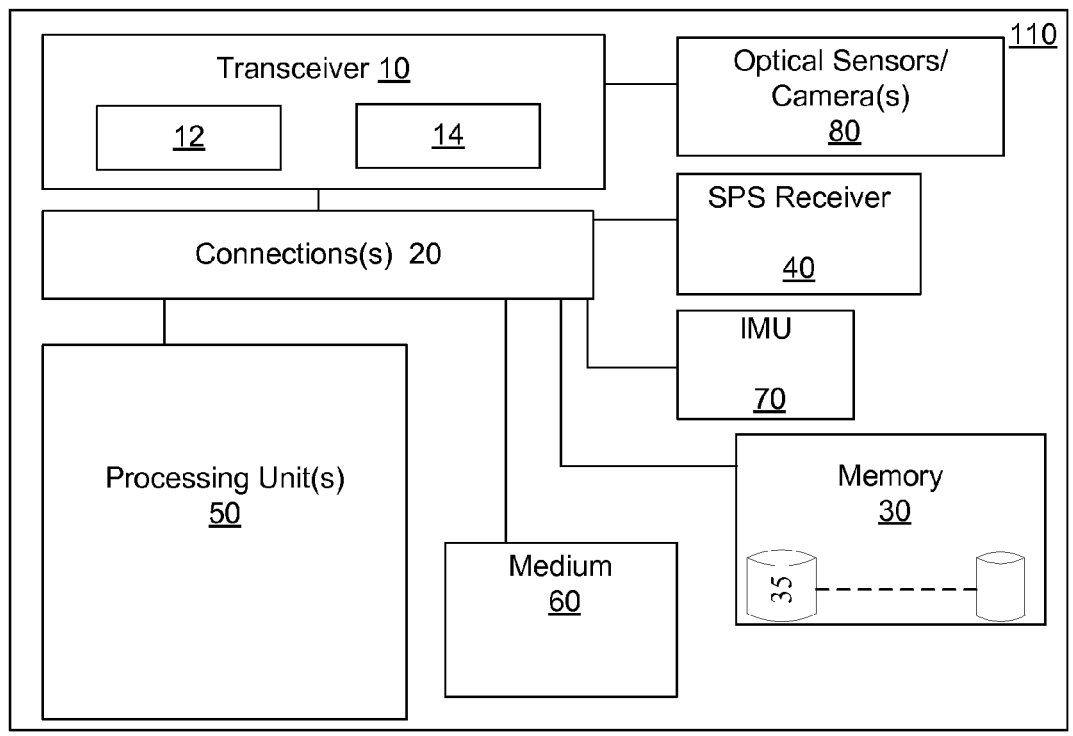
FIG. 1 shows a schematic block diagram illustrating certain exemplary features of a mobile station.

FIG. 1 shows a schematic block diagram illustrating certain exemplary features of Mobile Station (MS) 110. Note that the feature and/or functional units shown in FIG. 1 are exemplary and for descriptive purposes only and one or more functional units may be omitted and/or other functional units may be added in a manner consistent with disclosed embodiments. Exemplary mobile device 110 may also be modified in various ways in a manner consistent with the disclosure, such as, by adding, combining, or omitting one or more of the functional blocks shown. For example, in some configurations, mobile device 110 may not include IMU 130 or SPS Receiver 40. Further, in certain example implementations, mobile device 100 may include a variety of other sensors (not shown) such as an ambient light sensor, microphones, acoustic sensors, ultrasonic sensors etc. In some embodiments, portions of mobile device 100 may take the form of one or more chipsets, and/or the like.

Mobile station 110 may be stationary or mobile and may also be referred to as a mobile terminal, a user equipment (UE), an access terminal (AT), a subscriber station, a station (STA), etc. The term "mobile station" is also intended to include devices which communicate with a personal navigation device (PND), for example by using short-range wireless, infrared, wireline connection, or other connection—regardless of whether signal reception, assistance data reception, and/or position-related processing occurs at the device(s) or at the PND. Also, mobile station 110 may be a cellular phone, a personal digital assistant (PDA), a handheld device, a wireless device, a tablet, a laptop computer, a wireless modem, a cordless phone, a telemetry device, a tracking device, etc., which are capable of communication with a server, such as via the Internet, WiFi, or other network, and regardless of whether satellite signal reception, assistance data reception, and/or position-related processing occurs at the device, at a server, or at another device associated with the network. Any operable combination of the above is also considered a "mobile station."

Mobile station 110 may, for example, include various functional units such as one or more processing units 50, memory 30, transceiver 10 (e.g., wireless network interface), and (as applicable) an SPS receiver 40, optical sensor/camera 80, and non-transitory computer-readable medium 60, which may comprise fixed and/or removable media in an exemplary removable media drive (not shown). The functional units in mobile device 110 may be operatively coupled through one or more connections 20 (e.g., buses, lines, fibers, links, etc.). In certain example implementations, all or part of mobile terminal 120 may take the form of a chipset, and/or the like.

In some embodiments, Satellite Positioning System (SPS) receiver 40, in mobile station 110, may be enabled to receive signals associated with one or more SPS resources. A satellite positioning system (SPS) typically includes a system of transmitters positioned to enable entities to determine their location on or above the Earth based, at least in part, on signals received from the transmitters, which may be located on ground based control stations, user equipment and/or space vehicles. In a particular example, such transmitters may be located on Earth orbiting Satellite Vehicles (SVs). As used herein an SPS may include any combination of one or more global (such as Galileo, GPS, GLONASS etc), and/or regional navigation satellite systems such as satellite systems (such as QZSS, Beidou, IRNSS etc) and/or augmentation systems. Further SPS signals may include SPS, SPS like, and/or other signals associated with such one or more SPS. Mobile station 100 may be able to determine its position based on signals received from one or more SPS.

In some embodiments, MS 110 may also comprise transceiver 10, which may include a transmitter 12 enabled to transmit one or more signals over one or more types of wireless communication networks and a receiver 14 to receive one or more signals transmitted over the one or more types of wireless communication networks. For example, transmitter 12 and receiver 14 may be able to communicate with wireless networks including Wireless Local Area Networks (WLANs), Wireless Personal Area Networks (WPANs), Wireless Wide Area Networks (WWANs)/cellular networks, femtocells, and various other types wireless communication networks.

WWANs or cellular networks may include Code Division Multiple Access (CDMA) 1X network, a High Rate Packet Data (HRPD) network, a Wideband CDMA (WCDMA) network, a Global System for Mobile Communications (GSM) network, a General Packet Radio Service (GPRS) network, a Long Term Evolution (LTE) network, or some other wireless network. GSM, WCDMA and GPRS are part of Universal Mobile Telecommunications System (UMTS). LTE is part of Evolved Packet System (EPS). CDMA 1X and HRPD are part of cdma2000. GSM, WCDMA, GPRS and LTE are described in documents from a consortium named the "3rd Generation Partnership Project" (3GPP). CDMA 1X and HRPD are described in documents from a consortium named the "3rd Generation Partnership Project 2" (3GPP2).

WLANs may include, for example, wireless networks compatible with the Institute of Electrical and Electronics Engineers (IEEE) 802.11x family of standards, which may also be referred to as a Wi-Fi network. Such a network may also include Access Points or Wireless Access Points (APs or WAPs) that couple wireless communication devices to the WLAN. APs acts as a central transmitter and receiver of WLAN radio signals. WPANs may include Bluetooth networks, networks based on the IEEE 802.15x family of standards, or some other types of networks.

Optical sensors/Camera(s) 80 (hereinafter "Cameras") may send captured images to processing unit(s) 50. In some embodiments, Cameras 80 may comprise front-facing and rear facing cameras and may also incorporate CMOS sensors. In general, cameras may be color or grayscale cameras, video or still cameras, and/or RGB-D cameras, which capture color images in a Red-Green-Blue (RGB) format along with per-pixel depth information. In some embodiments, an RGBD camera, an ultrasonic sensor, or another sensor may be able to determine depth or distance information for POIs in conjunction with the capture of images of the object by cameras 80.

In one embodiment, the front facing camera may face the user during normal user operation of the device, while the rear facing camera may face away from the user during normal operation of the device. In one embodiment, images captured by cameras 80 may be in a raw uncompressed format and may be compressed prior to being processed and/or stored in memory 30 and/or medium 60. In some embodiments, image compression may be performed by processing unit(s) 50 using lossless or lossy compression techniques. In embodiments with RGB-D cameras, the image may be processed and stored along with the depth/distance related information. In some embodiments, the depth/distance information may be used by processing units 50 for location determination of MS 110.

In some embodiments, processing unit(s) 50 may also receive input from IMU 70. In some embodiments, IMU 70 may comprise 3 axis accelerometer(s), 3-axis gyroscope(s), and/or magnetometer(s). IMU 70 may provide velocity, orientation, and/or other position related information to processing unit(s) 50. In some embodiments, IMU 70 may output measured information in synchronization with the capture of each image frame by cameras 80. In some embodiments, the pose of camera 80 relative to an image may be determined or corrected based, in part, on input from IMU 70. In some embodiments, known intrinsic parameters and characteristics of camera 80 such as the focal length of the lens, camera focus distance etc. may be used in conjunction with input from IMU 70 to assist with and/or refine camera pose determination. In some embodiments, the estimated pose of the MS relative to a POI corresponding POI and a confidence interval associated with the estimated pose may be determined based on the MS captured images. In some embodiments, images captured by cameras 80 may be used to recalibrate or perform bias adjustments for IMU 70.

Processing unit(s) 50 may be implemented using a combination of hardware, firmware, and software. In some embodiments, processing unit(s) 50 may represent one or more circuits configurable to perform at least a portion of a data signal computing procedure or process related to the operation of MS 110. Processing unit(s) 50 may be capable of receiving instructions/data from receiver 14 and/or retrieving instructions/data from memory 30 and/or computer readable medium 60 and may respond to the instructions and/or send data/results using receiver 14. Processing units 50 may also be capable of processing various other received information either directly or in conjunction with one or more other functional blocks shown in FIG. 1. For example, processing unit(s) 50 may process images received from cameras 80 and/or stored in memory 30 or computer readable medium 60. For example, processor 50 may process images taken by camera 80 to identify one or more landmarks or POIs in the images, and generate and/or process one or more visibility maps based on the identified landmarks to determine a position of MS 110. Processing units may also obtain and use other information, such as output from IMU 70 and/or depth information from cameras 80, prior location information based on SPS signals, or trilateration based on Round Trip Time (RTT) and/or Received Signal Strength Indicator (RSSI) measurements, etc. during position determination of MS 110. Processing units 50 may also be capable of performing various other functions described herein.

Processing unit(s) 50 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying instructions may be used in implementing the methodologies described herein. For example, software code may be stored in a non-transitory computer-readable medium 60 and/or memory 30 and may be retrieved and executed by processing unit(s) 50. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Memory 30 may be implemented within processing unit(s) 50 and/or external to processing unit(s) 50. As used herein the term "memory" refers to any type of long term, short term, volatile, nonvolatile, or other memory and is not to be limited to any particular type of memory or number of memories, or type of physical media upon which memory is stored. In some embodiments, memory 30 may hold code to facilitate the operation of mobile device 110, and other tasks performed by processing unit(s) 50. For example, memory 30 may hold images, map data, information pertaining to POIs, program data and results, outputs of various sensors such as IMU 70, etc. In general, memory 30 may represent any data storage mechanism.

Memory 30 may also hold one or more databases 35 such as a map database, which may include 2-D and 3-D maps, POI databases, locations of POIs, images of POIs, features of POIs etc. In some embodiments, the maps may include one or more POI visibility maps, which may comprise a set of grid points. In some embodiments, medium 60 and/or memory 30 may comprise one or more databases that may hold information pertaining to various POI entities for a region around a current location of MS 110. In some embodiments, POI related information may include images of the POIs, locations of the POIs, POI features for SIFT or other image matching algorithms, visibility maps for the POIs, etc. In some embodiments, information stored in databases 35 in memory 30 may retrieved from computer readable medium 60 and/or received over a wireless network. For example, MS 110 may receive map databases and/or a POI database relevant to an area around a current location of MS 110 over a wireless network or by loading relevant information from computer readable medium 60. Memory 30 may include, for example, a primary memory and/or a secondary memory. Primary memory may include, for example, a random access memory, read only memory, etc. While illustrated in FIG. 1 as being separate from processing unit(s) 50, it should be understood that all or part of a primary memory may be provided within or otherwise co located and/or coupled to processing unit(s) 50. In one embodiment, a server, such as a location server may send map and POI databases for a serving cell or a region covered by a wireless network to MS 110, when MS 110 registers with the network or at some point thereafter.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc. In certain implementations, secondary memory may be operatively receptive of, or otherwise configurable to couple to a non-transitory computer-readable medium 60 in a removable media drive (not shown) coupled to mobile device 110. In some embodiments, non transitory computer readable medium may form part of memory 30 and/or processing unit(s) 50.

Figure 2A:
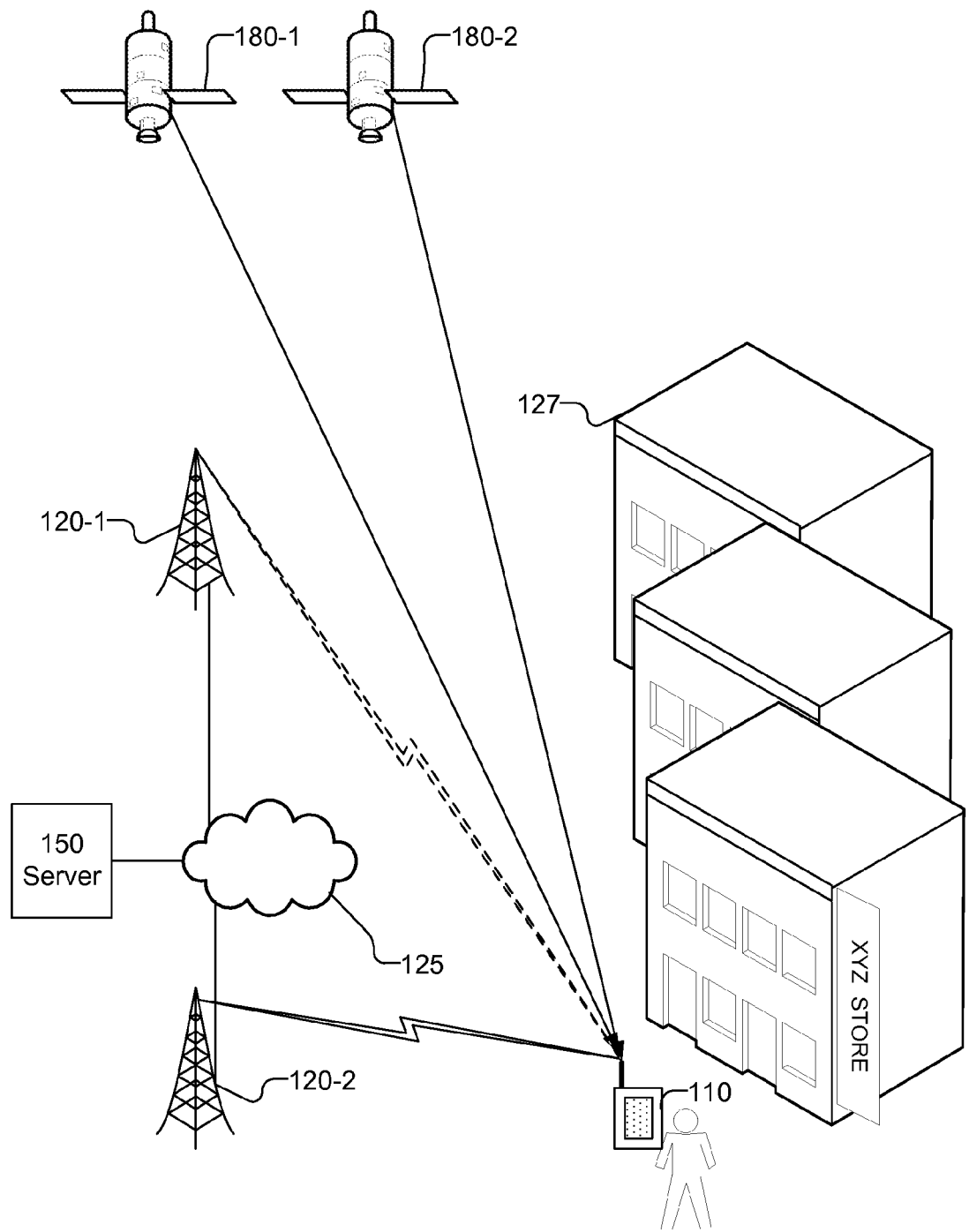
FIG. 2A shows a user at a location where an MS may receive positioning signals such as GPS signals from Satellite Vehicles (SVs) and/or wireless networks.

FIG. 2A shows a user at a location where MS 110 may receive positioning signals such as GPS signals from Satellite Vehicles (SVs) 180-1 and/or 180-2 and wireless network 125. Further, MS 110 may communicate with wireless network 125, which may take the form of a cellular network, though APs 120-1 or 120-2, which may be Node Bs, Base Transceiver Stations (BTS), evolved Node B's (eNode B), etc. MS 110 may be able to compute its location based on signals received from SVs 180 and/or by trilateration of RTT/RSSI measurements of signals received from wireless network 125.

MS 110 may also receive location assistance information from server 150 and/or communicate with server 150 during location determination. For example, server 150 may have map and POI information related to the area around a current location of MS 110. In some embodiments, server 150 may be part of a cellular network and may have map and POI related information for the serving cell and one or more neighboring cells. In some embodiments, the map and POI related information may be held in one or more databases and may be sent to, retrieved by and/or downloaded to local storage on MS 110. For simplicity only one server and one MS are shown in FIG. 2A. However, in general, there may multiple servers in communication with one or more mobile stations at any time.

FIG. 2A shows the user in a location where signal reception from SVs 180 and/or wireless network 125 may be possible. While MS 110 may have been able to receive GPS or Assisted GPS (A-GPS) signals for positioning just prior to entering building 127 such as a mall, in some instances, the user may not be able use GPS within the mall because MS 110 may not be able to acquire GPS signals. In other situations, MS 110 may not be able to acquire GPA or A-GPS signals in a dense outdoor environment because of signal losses or other environmental factors.

For example, if GPS or A-GPS signals are unavailable within building 127, the position of the user (or MS 110) just prior to entering building 127 may be used to approximate the location of MS 110 within building 127. In some embodiments, when GPS/A-GPS signals are unavailable, the most recent position fix obtained using SVs 180 and/or network 125 may be used as one approximation of a position of the MS 110. In some instances, the position of MS 110 may be further refined from the approximation above based on information received IMU 70. However, inaccuracies in location estimates may continue to arise because of errors or biases inherent in measurements by IMU 70. In some embodiments, landmark based positioning may be used to determine or refine the position of MS 110 when position determination by other methods is impaired. In some embodiments, the last or most recent position fix obtained using some combination of GPS/A-GPS, trilateration, network based positioning methods, and/or IMU based measurements may be used as an initial approximation of the location MS 110 when performing landmark based positioning.

Figure 2B:
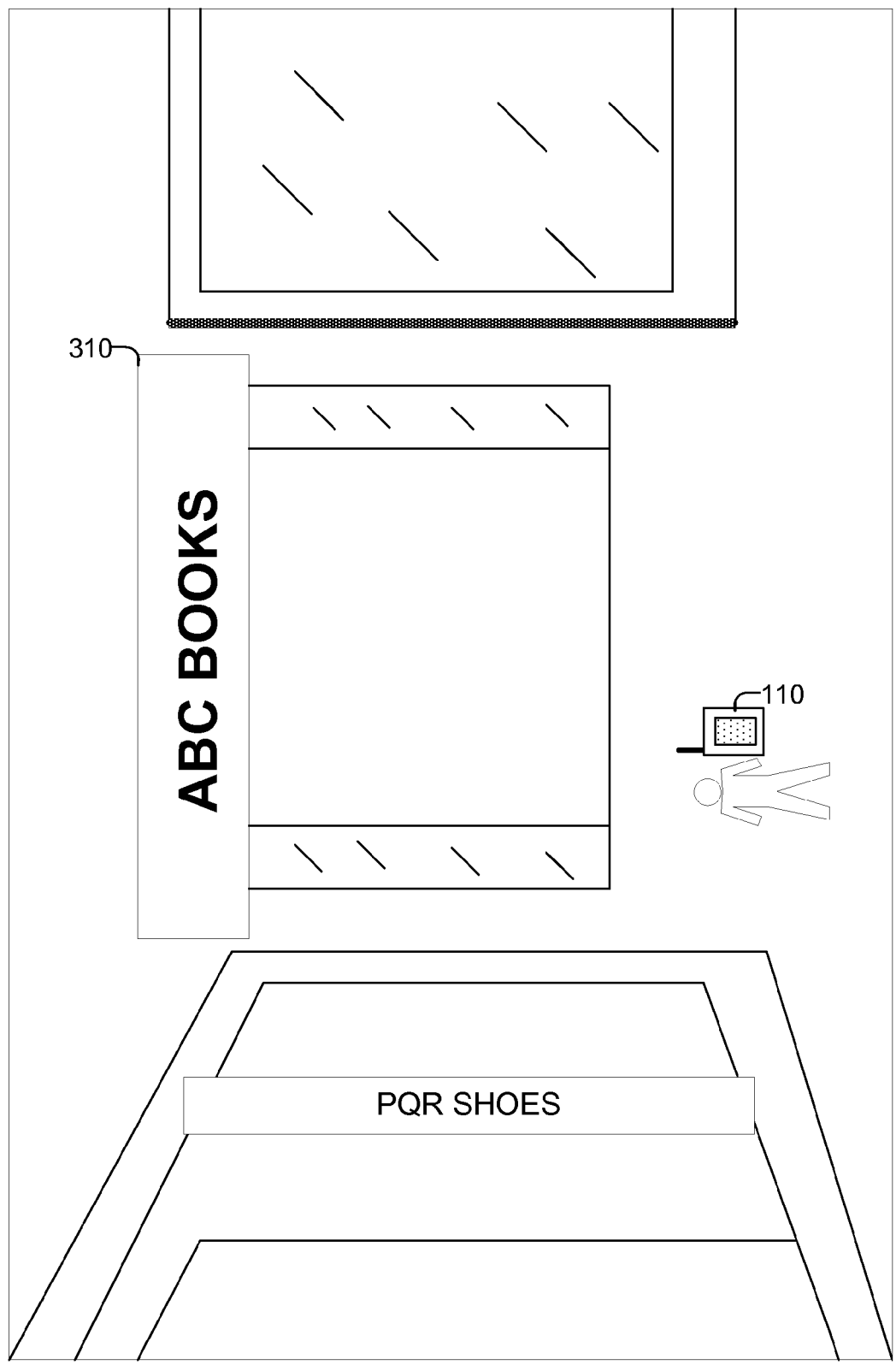
FIG. 2B shows user with a mobile station within a building such as a mall.

FIG. 2B shows user with a mobile station within a building such as a mall. As shown in FIG. 2B, an image captured by camera 80 on MS 110 within the mall may show one or more store signs such as POI 310, which is shown in FIG. 2B as store "ABC Books".

Figure 3:
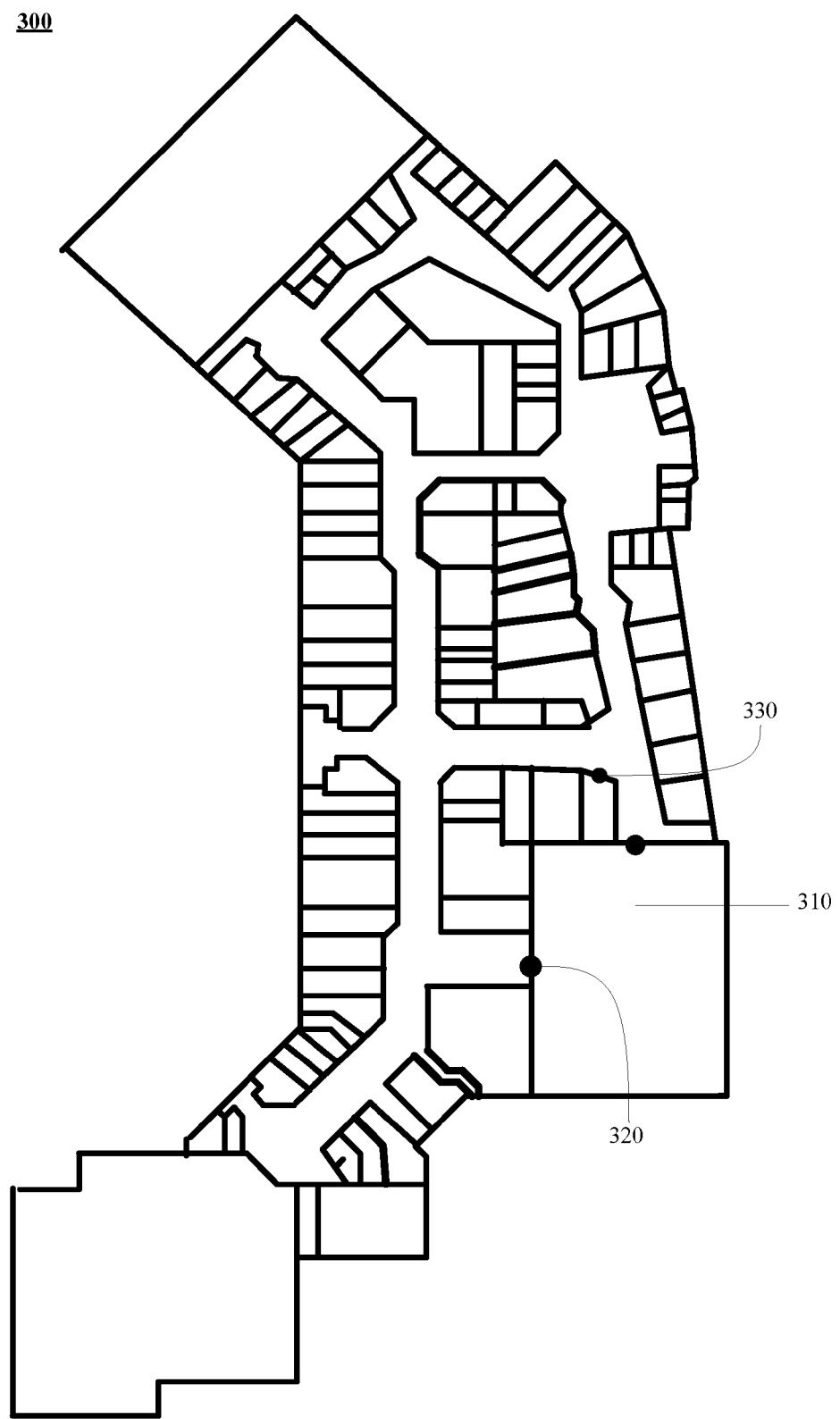
FIG. 3 shows an exemplary map of an indoor area, which may be a mall or the interior of a building or another structure.

FIG. 3 shows an exemplary map 300 of an indoor area, which may be a mall or the interior of building 127. Exemplary map 300 shows POIs 310, 320 and 330, which may be storefront signs in the mall. Storefront signs may be considered as landmarks because of their distinctive nature. The exact locations of POIs 310, 320 and 330 may be known because they are in fixed locations, for example, at the entrances of their respective stores. Further, the locations of the stores in mall may be known and stored in a POI or map database. In some embodiments, map 300 and/or the locations of POIs 310, 320, and 330 may be stored in one or more databases, such as exemplary databases 35 on MS 110 and/or databases on server 150. In some embodiments, images and/or features associated with images of POIs 310, 320 and 330 may be stored in the databases and the images/image features may be associated with the respective POIs.

Figure 4A:
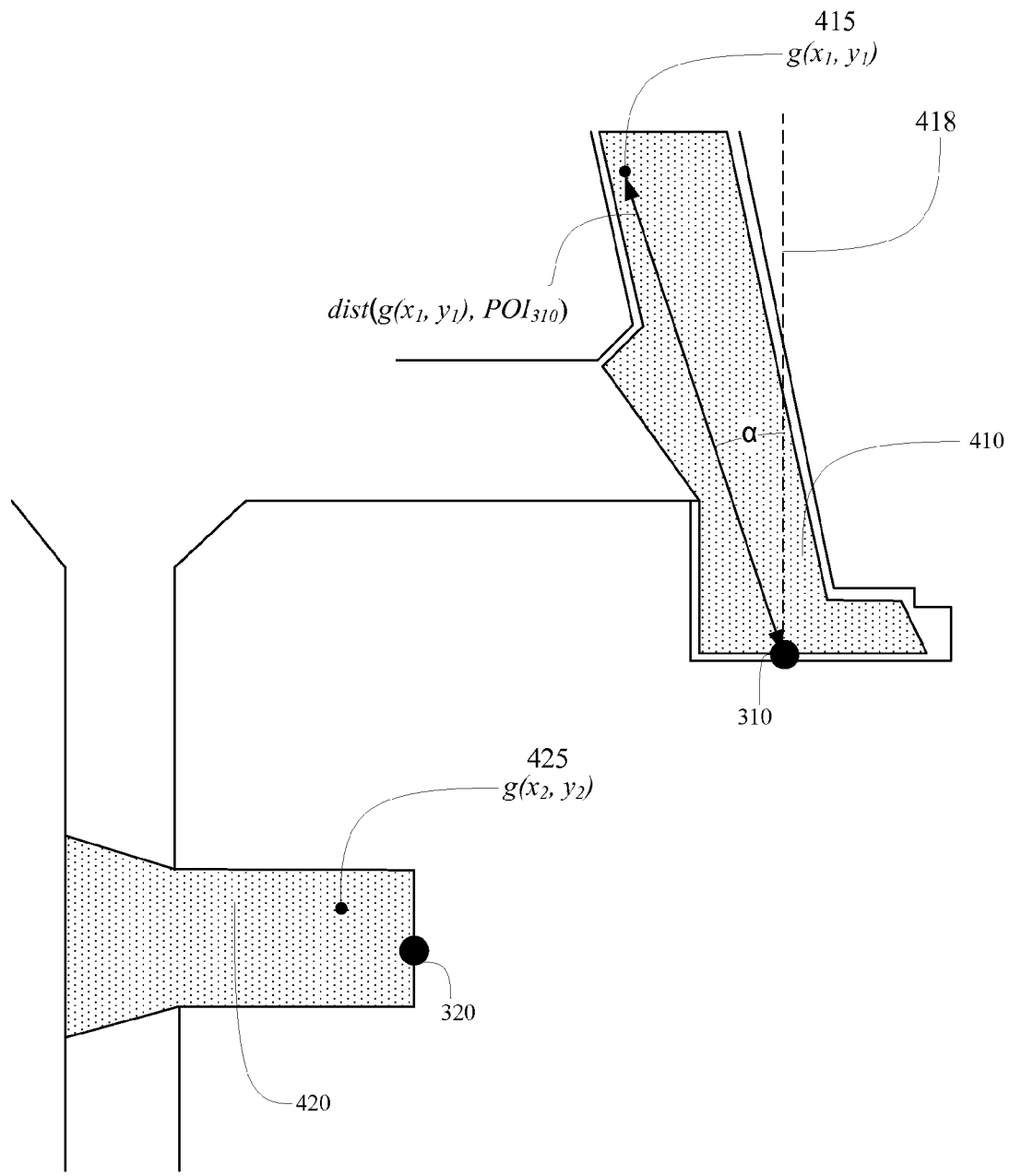
FIG. 4A shows an exemplary two-dimensional visibility map for a portion of map in FIG. 3, which has been enlarged for clarity.

FIG. 4A shows an exemplary two-dimensional visibility map 400 for a portion of map 300, which has been enlarged for clarity. Visibility map 400 shows at least some of the regions visible to entities 310 and 320. In FIG. 4A, grid points have been added to indicate visibility information. The visibility map for an entity may be thought of as some or all of non-obscured areas within line of sight of the entity. The visibility map for an entity may also be thought of as showing all grid points g(x, y) for on the map from where the entity is viewable.

Exemplary visibility map 400 shows that region 410 is visible to POI 310 (or conversely, POI 310 is visible to grid points in region 410) and that shaded region 420 visible to POI 320 (or conversely, POI 320 is visible to grid points in region 420). Thus, in FIG. 4A, a grid point $g(x_i, y_i)$ is in the line of sight of POI 310 if it lies in region 410, or in the line of sight of POI 320 if it lies in region 420. For example, when MS 110 takes captures an image of POI 310, MS 120 is in a line of sight of POI 310 and therefore located in visibility region 410. In some instances, MS 110 may be in a line of sight of several POIs and may capture images of some subset of the POIs.

Regions outside the shaded region are either not visible to the POI entity being considered, or are not being considered because they may lie outside some visibility threshold. For example, in some embodiments, regions that are distant from the POI and/or are at poor viewing angles may not be included in the visibility map and/or may be eliminated from consideration in operations described herein.

FIG. 4A shows exemplary grid points $g(x_1, y_1)$ 415 and $g(x_2, y_2)$ 425 (which have been exaggerated in FIG. 4A for clarity). FIG. 4A also indicates that point $g(x_1, y_1)$ 415 is separated from POI 310 by distance $dist(g(x, y), POI_{310})$. Further, as shown in FIG. 4A, grid point $g(x_1, y_1)$ lies at an angle α to normal 418 in 2-dimensional visibility map 400. The term "normal" or "normal vector," as used herein, refers to a straight line pointing in a direction perpendicular or orthogonal to, a reference line or vector in a 2-dimensional representation. In 3-dimensional space, the normal may be perpendicular or orthogonal to a reference plane.

Figure 4B:
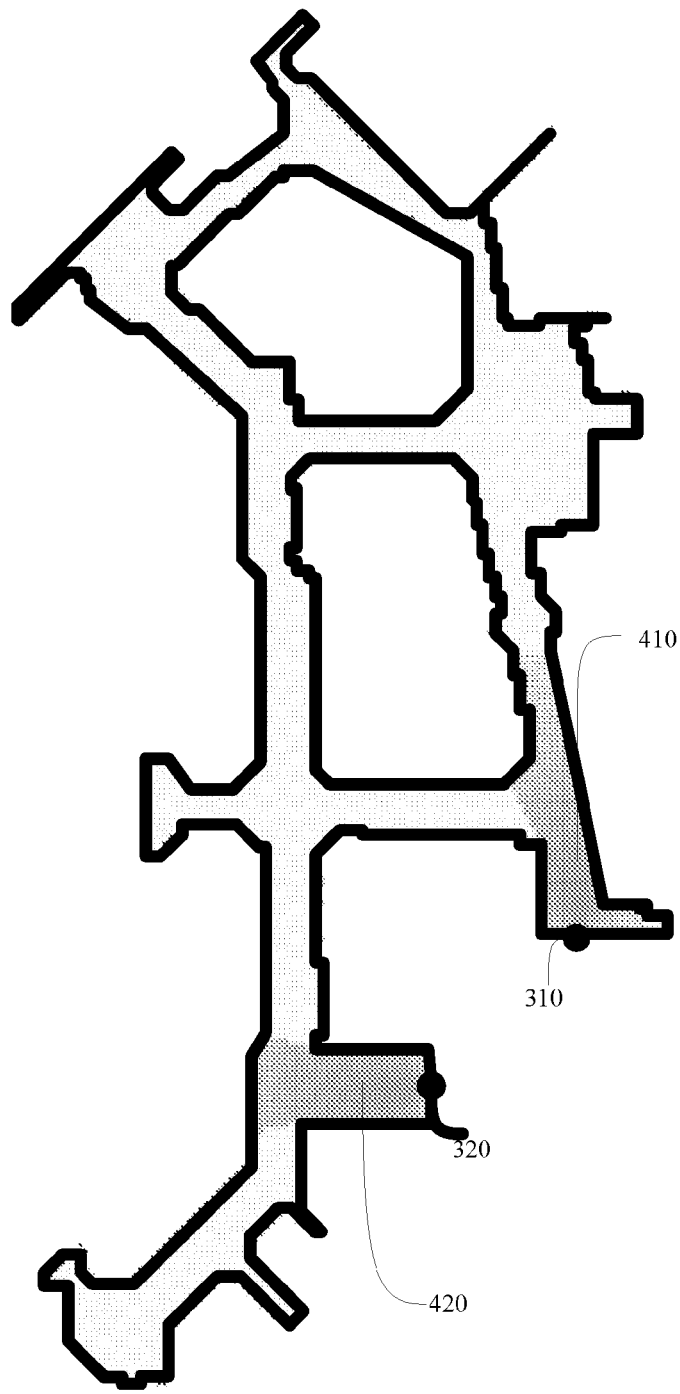
FIG. 4B shows exemplary visibility heat map, which shows at least some of the areas visible to entities 310 and 320.

FIG. 4B shows exemplary visibility heat map 450, which shows at least some of the areas visible to entities 310 and 320. Exemplary visibility heat map 400 shows a two-dimensional map, where darker shading implies better visibility and lighter shading implies less visibility. Thus, visibility may be highest normal to the entity (e.g. directly in front of a storefront sign) and at some distance d0 from the entity. Visibility may gradually decrease as distance from the entity is increased or decreased from d0 and as the angle of view moves away from the normal.

Visibility heat map 450 may limit the visibility area associated with a POI by a predetermined threshold, resulting in a smaller visibility map. In some embodiments, a predetermined threshold may be selected to represent some distance from the POI and/or some angle relative to the normal and may be representative of user or camera inability to clearly identify objects at that distance or angular view. In some embodiments, visibility maps 400 and/or 450 may include information pertaining to opaque barriers, such as walls of the building, overhangs, columns, and other objects that may obstruct the field of vision of the POI in question. Visibility may be set to zero if a point lies beyond the threshold, is at a poor viewing angle, or if there are any obstructions that prevent the viewing of the POI in question.

In FIGS. 4A and 4B, POIs 310 and 320 may be storefront signs and, in some embodiments, visibility maps 400 and/or 450 may be generated using previously stored information in response to a picture of a storefront taken by a camera on the MS. For example, if the image of the storefront sign captured by the user of the MS shows "ABC BOOKS," then the captured image may be processed to determine that the user is in front of an "ABC BOOKS" store entrance in a mall, which may be in building 127. In some embodiments, a subset of POIs may be identified out of a plurality of POIs in a region, using MS captured images of POIs and comparing and matching the MS captured images of each POI in the subset with corresponding stored POI images. For example, MS 110 may capture several images of POIs from a location, the MS captured POI images may be matched with stored POI images and a subset of POIs may be identified as being shown in the MS captured images and therefore visible to MS 100.

Various image processing and computer vision techniques such as the Scale Invariant Feature Transform (SIFT) may be used to identify features in a POI image captured by the MS and correlate the identified features in the captured image with features in reference images of the POI stored in a database. In some embodiments, the features selected for inclusion in a database may be highly distinctive, to permit individual features to be matched with high probability against a large database of features from many images. Such matching or feature identification may be achieved by MS 110, by a server, such as server 150, wirelessly coupled to MS 110, or by MS 110 in conjunction with one or more servers 150 wirelessly coupled to MS 110 and may be performed by some combination of hardware and/or software.

In some embodiments, SIFT may be used to extract distinctive and invariant features from images. These features may be used for robust matching of different views of an object or scene. In SIFT, image features selected for matching may be invariant to image scaling and rotation. SIFT permits robust feature matching across a substantial range of affine distortion, and through noise, changes in 3D viewpoints, and changes in illumination. Affine transformations pertain to image transformations which preserve straight lines, so that all points lying on a line continue to lie on a line after transformation. Affine distortion occurs when a transformation distorts lines in an image so that the collinear points prior to the transformation are skewed to some degree about a line post-transformation. SIFT algorithms are robust and tolerate affine distortion when performing feature matching. In one embodiment, Optical Character Recognition (OCR) may be used to identify the POI and the viewing angle of the camera relative to the POI may be estimated based on the distortion of the bounding box of the text or based on the detected vanishing points.

For example, the last known or most recent GPS position may used as an approximation of the location of MS 110 and images of POIs in an area around the last known/most recent GPS location may be searched for images corresponding to the image of POI 310 captured by cameras 80 on MS 110. In some embodiments, the position of MS 110 may be further narrowed from the last known/most recent GPS location based on information provided by IMU 70. In some embodiments, MS 110 may be able to connect to a WLAN through Access Points within the mall/building 127 and network based positioning methods may be used to calculate an approximate location of MS 110. In general, one or more techniques above may be used individually, or combined in a manner consistent with disclosed embodiments, to obtain an initial estimate of the location of MS 110. In some embodiments, images associated with an area around the initial estimate of the location of MS 110 may be searched to determine a correspondence with the image(s) taken by camera 80 on MS 110.

Accordingly, in one embodiment, an area around the user's last known/determined position may be searched for an image corresponding to POI 310. Once the storefront sign has been identified as "ABC BOOKS", it may be determined that there are two entrances 310 and 320 to the "ABC BOOKS" store where the sign may be located. Visibility map 450 may then be generated based on POIs 310 and 320 and regions 410 and 420 may be seen a possible locations of the MS 110 and/or the user because POIs 310 and 320 are visible from these regions.

In some embodiments, the position of the user may be further refined based on a likelihood or probability relative to a POI (such as POI 310) that a user is at a specific grid point. In one embodiment, the probability, relative to a POI, that an MS is at a specific grid point may be estimated based on an optimal or estimated viewing angle and/or an optimal or estimated distance from which the POI can be seen.

In another embodiment, when computer vision based techniques are applied to images captured by the MS and used for pose estimation, then, the probability, relative to a POI, that an MS is at a specific grid point may be estimated using the pose estimation and a confidence interval or accuracy associated with the pose estimation. In some embodiments, MS pose estimation may be based, in part, on information provided by IMU 70. In some embodiments, pose related information provided by IMU 70 may be used in conjunction with computer vision based techniques. When MS pose estimation uses information provided by IMU 70, then the probability, relative to a POI, that an MS is at a specific grid point may be estimated using the pose estimation and by adjusting the confidence interval based on the accuracy associated with the IMU/hybrid pose estimation.

In a further embodiment, the probability, relative to a POI, that an MS is at a specific grid point may be estimated based on knowledge of previous locations from where people have seen this landmark. For example, a history based on information compiled from various information sources such as third party information sources, which may include images associated with the POI in question may be used to determine a probability relative to the POI that an MS is at a specific grid point. For popular attractions, there may be preferred vantage points from which pictures are typically taken, or from which features associated with the POI that may be advantageously viewed. By comparing an image taken by MS 110 with the images from one or more third party sources, a probability, relative to a POI, that an MS is at a specific grid point may be ascertained. In some embodiments, the images may be available from the Internet, from various picture sharing/social media web sites such as Flickr, Picasa, Facebook etc, from image search engines such as Yahoo, Google, Bing, etc., and/or from a web site associated with the POI.

In some instances, such as where pose estimation for a landmark $POI_j$ is unavailable, and no prior history of locations and images from where people have seen the landmark exists, then, in some embodiments, an individual POI grid point weight $w_{POI_j}^{g(x,y)}$ can be assigned to each point $g(x, y)$ relative to an optimal or estimated viewing angle and/or an optimal or estimated distance for viewing the landmark $POI_j$. In some instances, the optimal viewing angle and/or optimal distance may correspond to the viewing angle and/or distance from which the landmark is viewed best. The optimal viewing angle and/or distance to view the landmark may be determined empirically, though heuristics, or by other estimation techniques. For example: an optimal view of a specific store may be from a distance of about 10 feet from the storefront, and the optimal viewing angle of the store front could be directly facing the store front, i.e. in the normal vector direction from the store front.

An individual POI grid point weight $w_j^{g(x,y)}$, which is a measure of the probability relative to $POI_j$ that the MS is at grid point $g(x,y)$, may then be set as the product of a distance based weight ($w\_d_j^{g(x,y)}$) and a viewing angle based weight ($w\_\alpha_j^{g(x,y)}$). The individual POI grid point weight for a grid point corresponds to a distinct POI and represents a probability relative to the corresponding POI that the MS is located at that grid point.

Accordingly, for each grid point $g(x,y)$, the individual POI grid point weight $w_j^{g(x,y)}$ relative to a $POI_j$ may be calculated as:

$$w_j^{g(x,y)} = w\_d_j^{g(x,y)} * w\_\alpha_j^{g(x,y)} \quad (1)$$

where, $$w\_d_j^{g(x,y)} = \left[1 - \frac{dist(g(x, y), POI_j) - d0_j}{maxRange_j}\right]^2, \quad (2)$$

$$w\_\alpha_j^{g(x,y)} = \sqrt{\left(1 - \sin(\alpha_j^{g(x,y)})\right)}, \quad (3)$$

and, $d0_j$ is the optimal or estimated distance to view the $POI_j$,
$dist(g(x, y), POI_j)$ is the distance from grid point $g(x,y)$ to the $POI_j$, $maxRange_j$ is the maximum distance from which $POI_j$ can be viewed, and
$\alpha_j^{g(x,y)}$ is the angle between the normal and the vector $(POI_j, g(x,y))$ In some embodiments, $d0_j$ and $maxRange_j$ may be determined based on $POI_j$ dimensional characteristics and/or settings or capabilities of the camera on/coupled to the MS.

In some embodiments, the individual grid point weight $w_j^{g(x,y)}$ for a grid point $g(x,y)$ relative to a $POI_j$ may be set to zero if grid point $g(x,y)$ cannot view $POI_j$, or if the distance of grid point $g(x,y)$ from $POI_j$, $dist(g(x, y), POI_j) \geq maxRange_j$, or if the angle $\alpha_j^{g(x,y)} >$ maxAngle$_j$ where maxAngle$_j$ is a threshold angle relative to the normal beyond which visibility of $POI_j$ is considered to be poor. Accordingly, if either $w\_d_j^{g(x,y)}$ or $w\_\alpha_j^{g(x,y)}$ is zero, then individual grid point weight $w_j^{g(x,y)}$ for a grid point $g(x,y)$ relative to a $POI_j$ is given by $w_j^{g(x,y)} = w\_d_j^{g(x,y)} * w\_\alpha_j^{g(x,y)} = 0$.

In some embodiments, pose estimation may be possible based on the image captured by the camera on the MS and/or other sensors, such as IMU 70 on MS 110. Pose estimation may be possible using various well known computer vision and image processing techniques. In addition, in some embodiments, a quality or confidence interval may be associated with the pose estimation. For example, a pose estimation may indicate that the camera view angle is 45° from the storefront normal, and the error of the estimate may ±10°. In some embodiments, the error or confidence interval may be obtained empirically or based on prior experimental results. In some embodiments, the pose estimation may be used if the confidence interval for the pose estimation is higher than some threshold confidence interval, or if the error estimate is below some threshold error estimate. Threshold confidence intervals and threshold error estimates may be obtained empirically, for example, by experimentation. In some embodiments, threshold confidence intervals and/or error estimates may be known based on the specifications or other parameters associated with camera(s) 80 and/or IMUs 70.

In situations where pose estimation is available, the individual POI grid point weight for each grid point $g(x,y)$ relative to a $POI_j$ may be calculated (using equation (1) above) as $w_j^{g(x,y)} = w\_d_j^{g(x,y)} w\_\alpha_j^{g(x,y)} *$, and $w\_d_j^{g(x,y)}$ is calculated (using equation (2) above) as, $$w\_d_j^{g(x,y)} = \left[1 - \frac{dist(g(x, y), POI_j) - d0_j}{maxRange_j}\right]^2,$$

and the angle based weight is calculated as $$w\_\alpha_j^{g(x,y)} = \sqrt{(1\sin\alpha_j^{g(x,y)}\alpha0_j))} \quad (4)$$

where $\alpha0_j$ is the estimated view angle.

In some embodiments, prior knowledge of the history of user locations from where the landmark or POI has been see may be used to derive a likelihood of user positions. For example, images associated with a history of user locations may be available from photographs posted on third party information sources including websites such as Picasa, Flickr, Facebook, a website associated with the location, etc. In some instances the photographs may be tagged with the locations of users at the time the photograph was captured. For example, people may provide and/or describe their locations when they have taken images around a certain landmark or POI. When the physical dimensions of the landmark or POI are known, and/or a large number of user images of the POI are available, the MS/user's position relative to the landmark may be inferred based on images captured by MS 110. For example, it may be known from historical data that a particular landmark is typically viewed from one side, so it may be possible to further narrow the MS location by comparing images captured by the MS and historical images.

Thus, the individual grid point weight may be based on at least one of: a distance (dist(g(x, y),$POI_j$)) and/or a viewing angle ($\alpha_j^{g(x,y)}$) of the grid point (g(x,y)) from the corresponding POI ($POI_j$) relative to an optimal or estimated distance ($d0_j$) and an optimal or estimated view angle ($\alpha 0_j$) for viewing the corresponding POI, respectively; or an estimated pose of the MS relative to the corresponding POI and a confidence interval associated with the estimated pose; or a history based on compiled information comprising images associated with the corresponding POI. Accordingly, in some embodiments, the grid points in visibility heat map 450 may be weighted with individual POI grid point weights relative to POIs 310 or 320 using one or more of the applicable techniques outlined above in a manner consistent with disclosed embodiments.

Figure 4C:
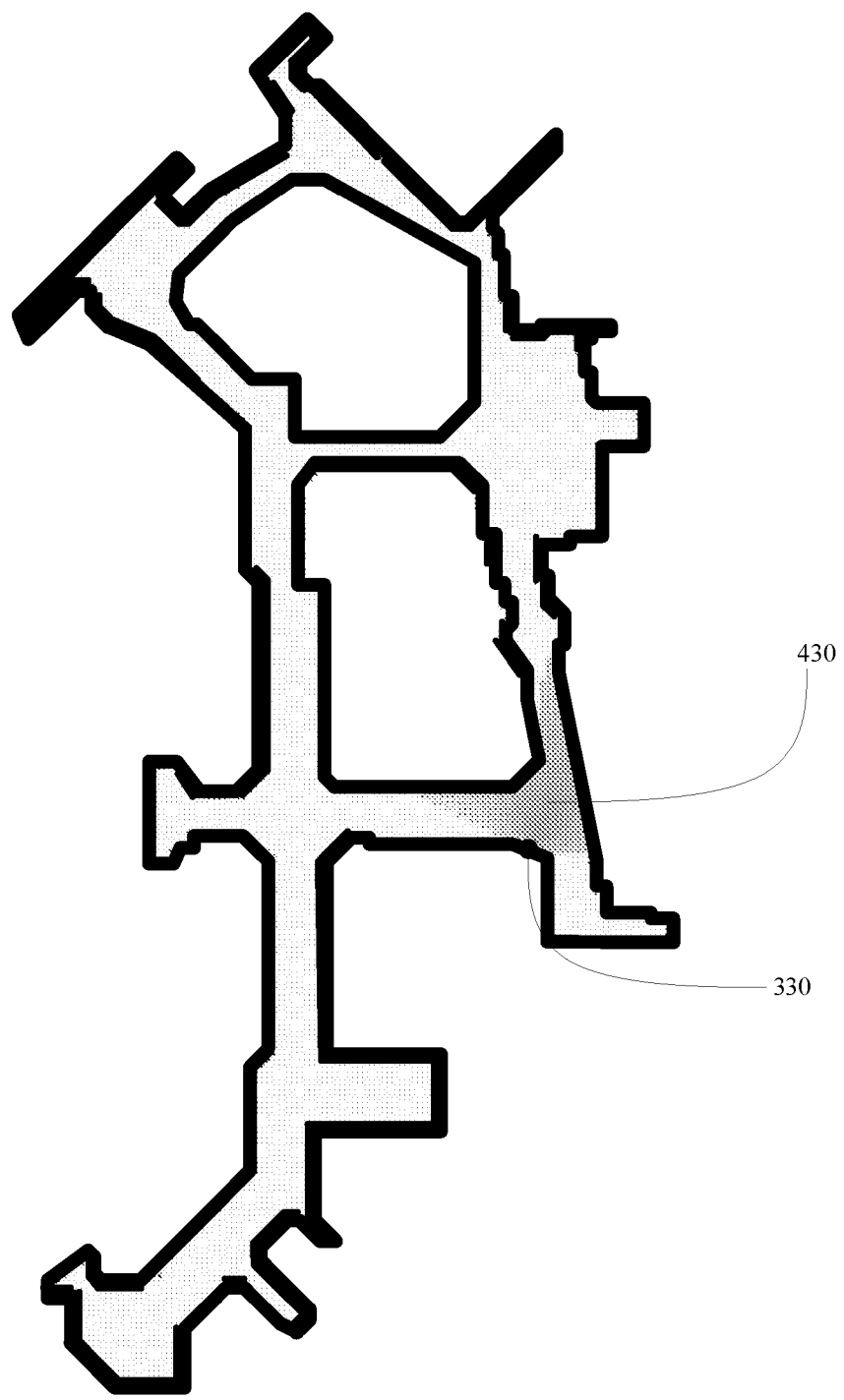
FIG. 4C shows another exemplary visibility heat map 470 for POI 330.

FIG. 4C shows another exemplary visibility heat map 470 for POI 330. As shown in FIG. 4C, shaded region 430 is visible to POI 330 (or conversely, POI 330 is visible from region 430). For example, the user may use (or have used) the MS to take an image of another storefront sign visible to the user such as POI 130. For example, POI 130 may correspond to storefront sign "Starbucks" (not shown). Once the storefront has been identified as "Starbucks", weighted visibility heat map 470 may then be generated based on POI 330 and region 430 may be seen as another possible location of the user because POI 330 is visible from region 430. In some embodiments, grid points in visibility heat map 470 may be weighted with individual POI grid point weights relative to POI 330.

In some embodiments, the user may be alerted that another image may be useful for narrowing the location of MS 110 because of the ambiguity associated with POI 310 (i.e. two store entrances 310 and 320 with the same storefront sign). In some embodiments, the alert may be provided by a landmark based positioning application running on MS 110 and/or a server, which may be in communication with MS 110 through a WLAN in the mall.

Figure 4D:
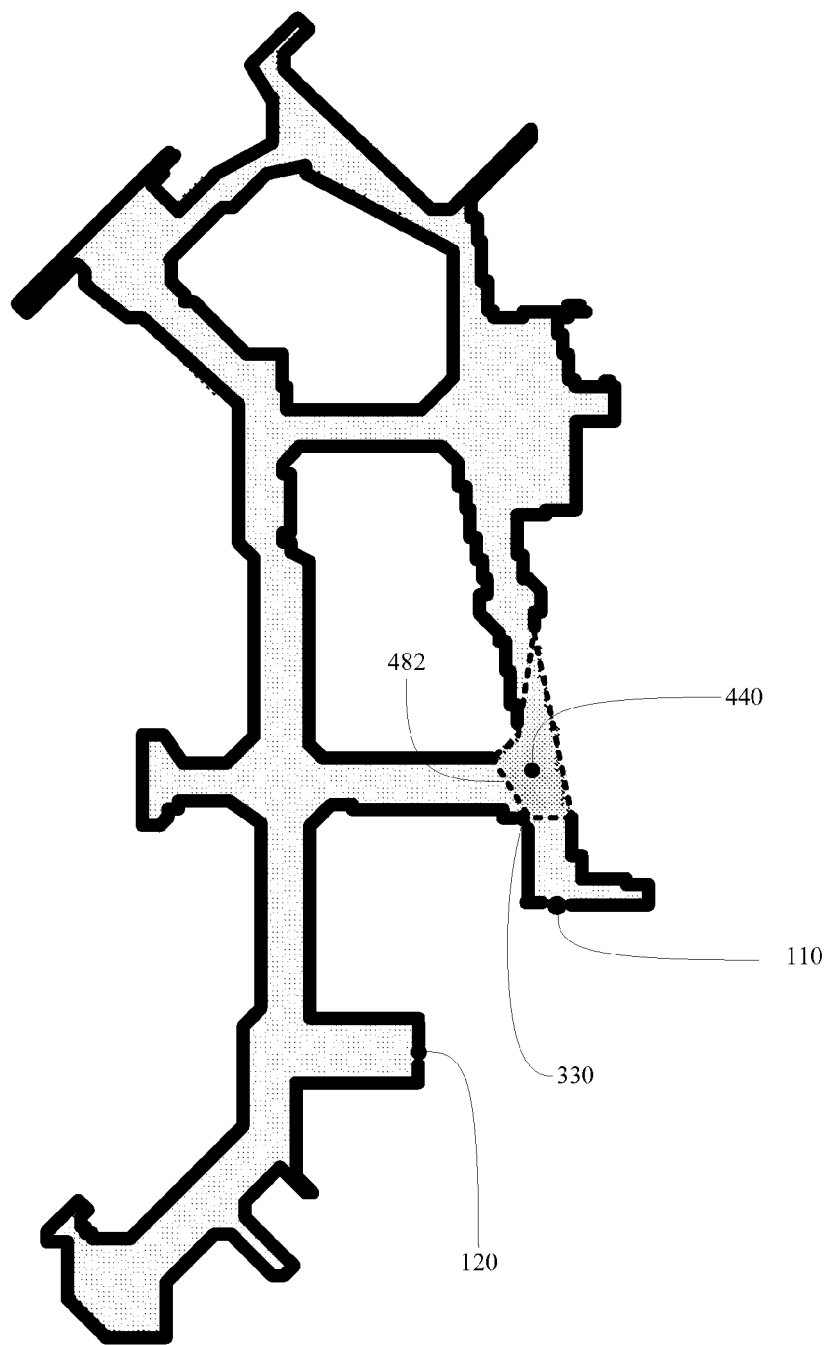
FIG. 4D and FIG. 4F show an exemplary visibility heat map showing an estimated location for the MS based on the overlap between regions 410 and 430 and showing cumulative grid point probabilities based on POIs 310 and 330.
Figure 4E:
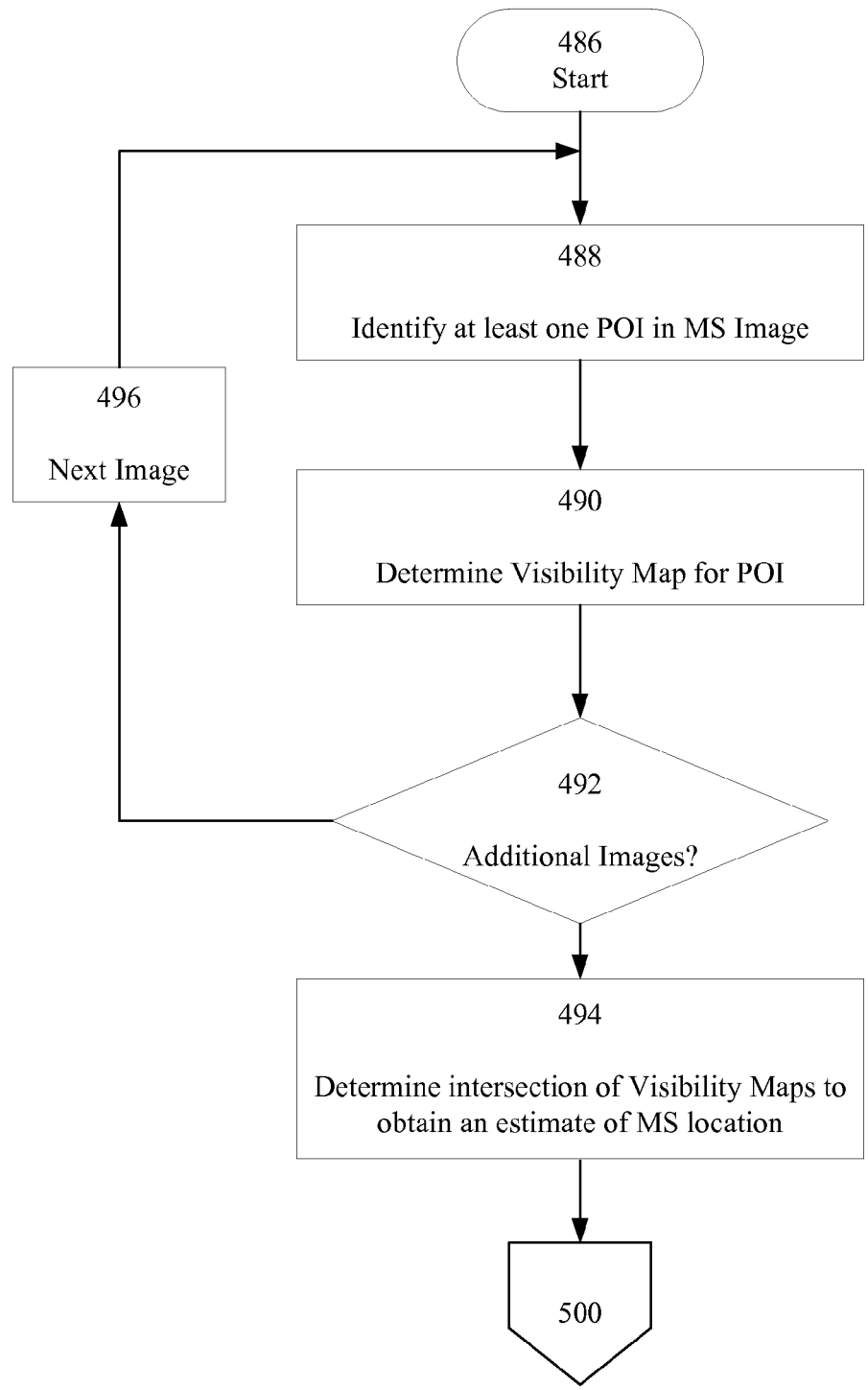
FIG. 4E shows an exemplary method to calculate an estimated location of an MS.
Figure 4F:
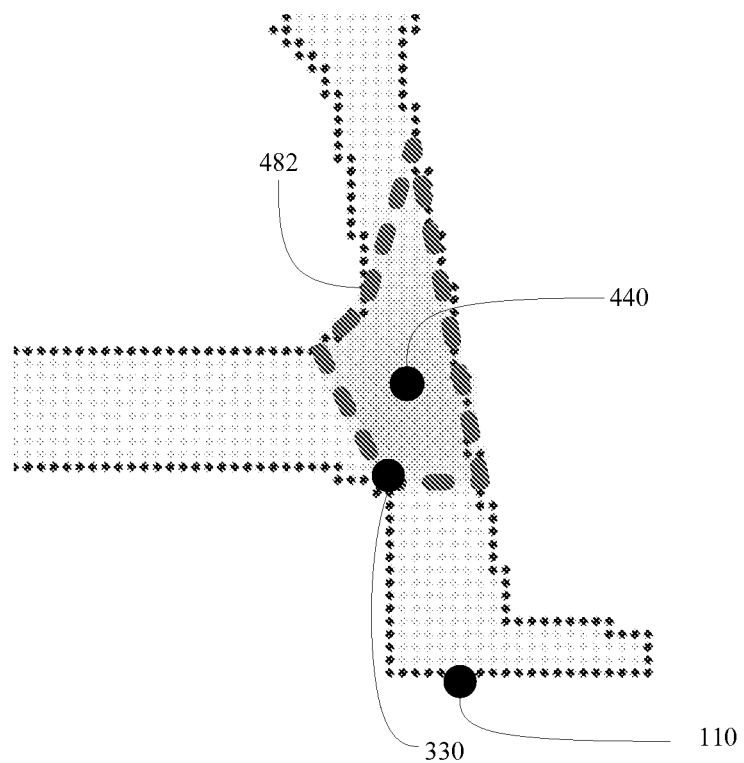

FIG. 4D and FIG. 4F show an exemplary visibility heat map 480 showing an estimated location for the MS based on the overlap between regions 410 and 430 and showing cumulative grid point probabilities based on POIs 310 and 330. In some embodiments, in visibility map 480, region 482 (shown by the dashed lines) representing the intersection of regions 410 and 430 may be computed as a likely location of the MS/user. The term "intersection" as used herein refers to mathematical intersection of two or more sets, with the intersection being given by those elements that are common to all the sets being considered. For example, the intersection of regions 410 and 430 would be all grid points that are present in region 410 and also in region 430. In one embodiment, an algorithm to determine a likely location of MS 110 may obtain grid points in visibility map 480 as the intersection of visibility maps 450 and 470. Visibility map 480 shows the intersection, given by region 482, which is the set of likely positions of MS 110.

In some embodiments, an estimate for the location of the MS/user relative to a plurality of POIs may be obtained based on a cumulative grid point weight, which represents the probability that an MS is at a specific grid point. In some embodiments, a cumulative grid point weight may be computed for each grid point in region 482. The cumulative grid point weight may be computed as a function of POI grid point weights associated with a grid point in a visibility map such as visibility map 480.

For example, a cumulative grid point weight $W_{g(xi, yi)}$ for a grid point $g(x_i,y_i)$ on visibility maps may be computed as a function of the set of POI grid point weights $w_j$, where $w_j$ is the POI grid point weight of grid point $g(x_i,y_i)$ relative to corresponding the $j^{th}$ POI $POI_j$. For example, a cumulative grid point weight $W_{g(xi, yi)}$ for a grid point $g(x_i,y_i)$ in region 482 in visibility map 480 may be computed based on POI grid point weights $w_j$ relative to POIs 110 and 130.

In general, for a set of M grid points and a subset of N POIs that are visible from a location of MS 110 and given by $POI_0$ through $POI_{N-1}$, the cumulative grid point weight $W_{g(xi, yi)}$ for each grid point $g(x_i,y_i)$ $1 \leq i \leq M$ on a visibility map may be calculated as:

$$W_{g(xi,yi)} = w_0^{g(xi,yi)} * w_1^{g(xi,yi)} * w_2^{g(xi,yi)} * \ldots * w_{N-1}^{g(xi,yi)} \tag{5}$$

$w_j^{g(xi,yi)}$ is the POI grid point weight of grid point $g(x_i,y_i)$ for corresponding $j^{th}$ POI, $0 \leq j \leq N-1$; and $w_j^{g(xi,yi)} = w\_d_j^{g(xi,yi)} w\_\alpha_j^{g(xi,yi)}*$ where $w\_d_j^{g(xi,yi)}$ and $w\_\alpha_j^{g(xi,yi)}$ are distance and angle based weights, respectively, for $g(x_i,y_i)$ for $POI_j$. For example, for POIs 320 and 330, there are no grid points in region 420 from which POI 330 is visible, and no grid points in region 430 from which POI 310 is visible. Therefore, the cumulative weight of grid points in region 420 relative to POIs 320 and 330 is zero. Conversely, POIs 310 and 330 are visible from all grid points in region 482. Therefore, each grid point in region 482 may have a non-zero cumulative weight relative to POIs 310 and 330.

Accordingly, the cumulative grid point weight for each grid point may be computed as a function of individual POI grid point weights for each POI in the subset of POIs. For example, the function to compute the cumulative grid point weight for each grid point may be a product of the individual POI grid point weights of POI in the subset. In some embodiments, the cumulative grid point weight may be computed for grid points in an area common to the visibility maps of the subset of POIs. Further, in some embodiments, the area common to the visibility maps of the subset of POIs is obtained from an intersection of visibility maps corresponding to the subset of POIs The location of the MS/user may then be estimated as $$loc(X) = \frac{\sum_{i=1}^{M} x_i W_i}{\sum_{i=1}^{M} W_i} \tag{6A}$$

and $$loc(Y) = \frac{\sum_{i=1}^{M} y_i W_i}{\sum_{i=1}^{M} W_i} \tag{6B}$$

where $W_i$ is the cumulative grid point weight for grid point $g(x_i,y_i)$ on the visibility map. The estimated location of the MS may be given as (loc(X), loc(Y)). In FIG. 4D, the location of the MS is estimated as the grid point 440.

FIG. 4E shows a flowchart of an exemplary method 485 to calculate an estimated location of MS. In some embodiments, method 485 may be performed by MS 110 and/or a server wirelessly coupled to MS 110, or may be distributed between MS 110 and the server.

In some embodiments, the method may start in step 486. Next, in step 488, at least one POI may be identified in an image captured by MS 110. In some embodiments, the last known/most recent location of MS 110 may be used to obtain an initial estimate or approximation of the location of MS 110 and the image captured by MS 110 may be matched with images of POIs in a region around the initial estimate. In some embodiments, a subset of POIs may be identified from a plurality of POIs in a POI database by matching MS captured images of each POI in the subset with a corresponding stored POI images. For example, the stored POI images may be matched to corresponding MS captured images based, in part, on Scale Invariant Feature Transform (SIFT) techniques.

Next, in step 490, a visibility map for the POI identified in step 488 may be generated. For example, the visibility map may be generated using a plurality of vectors representing lines of emanating from the POI and ending at opaque barriers on the map, and/or at a predefined distance threshold (which may be specified by maxRange). In some embodiments, the plurality of vectors may further be limited by an angular threshold from a normal vector (which may be specified by maxAngle). By integrating over the plurality of vectors, a visibility region representative of the visibility map may be calculated. In some embodiments, a visibility maps for POIs may be generated in advance, stored and made available as part of a map and/or POI database.

In step 492, the algorithm may determine if additional images are present or may be requested. For example, if there is ambiguity related to the POIs (e.g. two POIs 310 and 320 associated with the "ABC BOOKSTORE" storefront), additional images may be requested and/or obtained and processed. If there are additional images to be processed ("Y" in step 492), then, in step 496, the next image may be selected and the process returns to step 488 to begin another iteration.

If there are no more images ("N" in step 492), then, in some embodiments, an intersection of visibility maps may be computed in step 494. In some embodiments, the computation of the intersection of visibility maps may yield a set of grid points that define a region, which may be used as an estimate of the location of MS 110. In some embodiments, algorithm 485 may terminate and invoke method 500. In some embodiments, method 500 may further refine or narrow the estimated location of MS 110.

Figure 5:
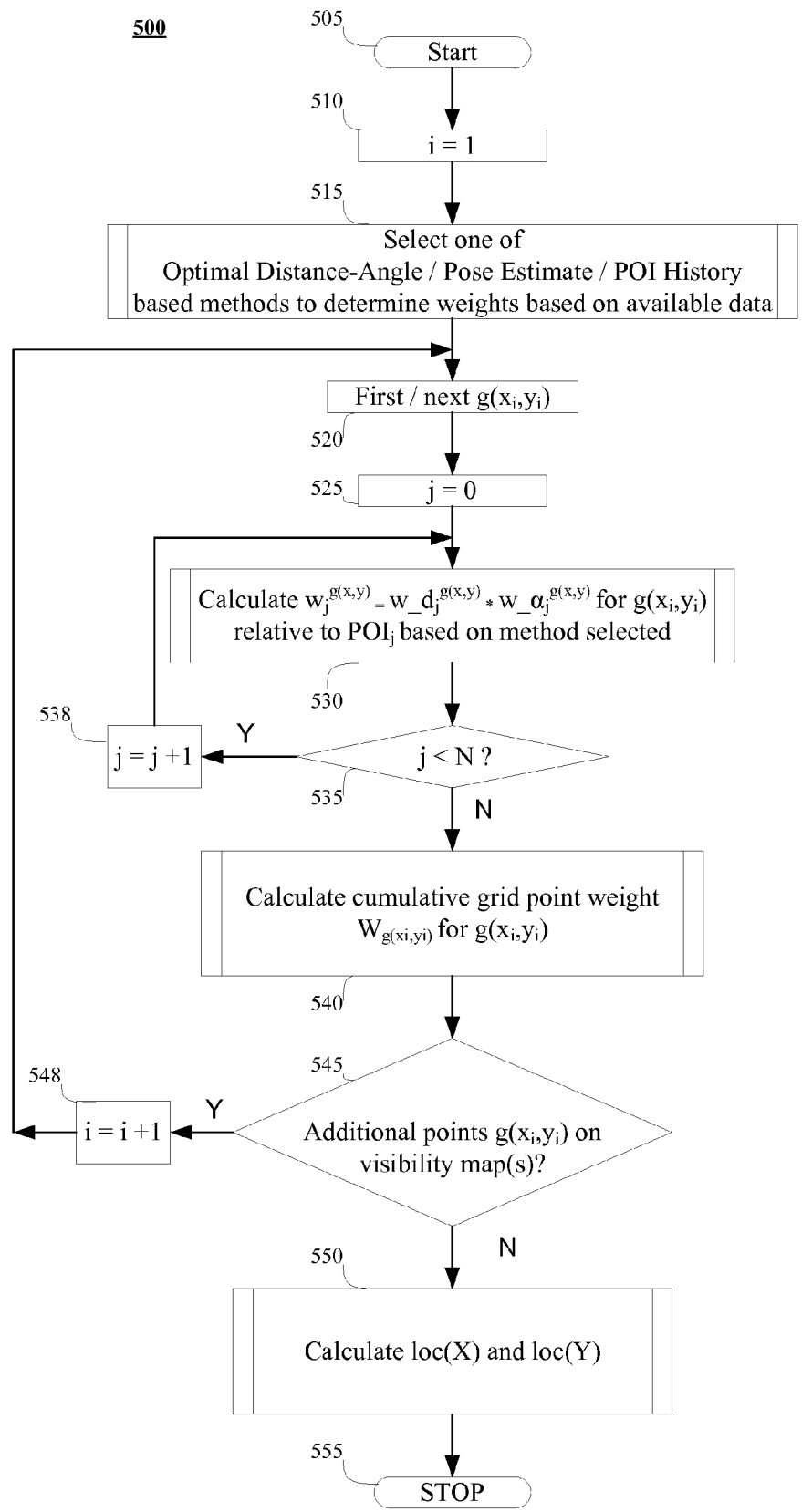
FIG. 5 shows an exemplary method to calculate an estimated location of MS in a manner consistent with disclosed embodiments.

FIG. 5 shows an exemplary method 500 to calculate an estimated location of MS in a manner consistent with disclosed embodiments. In some embodiments, method 485 may optionally be performed prior to the execution of method 500. In some embodiments, method 500 may be invoked when method 485 completes.

In some embodiments, exemplary method 500 may be performed by the MS, by a server wirelessly coupled to the MS, or may be distributed between the MS and one or more servers wirelessly coupled to the MS. For example, when a server detects or is informed that the MS is near a location such as a mall or another POI, data pertaining to one or more locations in a region around the POI, which may be stored in a database coupled to the server, may be automatically sent to, requested by, and/or retrieved by the MS. In some embodiments, data pertaining to the POI received by the MS may be stored in a local cache or database for use during landmark based positioning. In another embodiment, MS may send captured images to the server, which may compute an estimated location using exemplary method 500. In some embodiments, method 500 may be used to estimate a position of a mobile station (MS) based on known locations of a plurality of Points of Interest (POIs), where each POI may be associated with a corresponding visibility map comprising a set of grid points.

In some embodiments, exemplary method 500 may start in step 505 and in step 510, a counter i, which serves as a counter for the number of grid points g(x, y) in a visibility map, may be initialized. Next, in step 515, a method of determining location probabilities or weights (i.e. a weighting function) may be selected based on the available data. In some embodiments, the weighting function selected, which may be seen as assigning probabilities in a location probability distribution, may be based on one of: (i) an optimal or estimated viewing angle and distance from which a POI/landmark can be seen; (ii) pose estimation and a confidence interval or accuracy associated with the pose estimation, when computer vision, IMUs or sensors, and/or hybrid techniques are used for pose estimation based on images captured by the MS; and (iii) using knowledge of previous locations from where people have seen this landmark. For example, a history based on information compiled from various information sources, including images associated with the POI in question may be used to determine a probability relative to the POI that an MS is at a specific grid point.

In step 520, the first or next grid point $g(x_i,y_i)$ is selected. In some embodiments, the first/next grid points may be selected from a visibility map representing an intersection of areas from where a plurality of POIs are visible to MS. Next, in step 525, a counter j, which counts the number of POIs, is initialized. In step 530, the POI grid point weight $w_j$ of grid point $g(x_i,y_i)$ relative to corresponding $POI_j$ (the $j^{th}$ POI) is calculated in accordance with the method selected in step 515. The algorithm then proceeds to step 535, which determines if there are additional POIs to be processed.

If there are additional POIs ("Y" in step 535), the counter j is incremented in step 538 and the algorithm returns to step 530 to begin another iteration to calculate the POI grid point weight for the next corresponding POI. If there are no further POIs ("N" in step 535), the algorithm proceeds to step 540, where the cumulative grid point weight $W_{g(xi,yi)}$, is calculated as a function of the individual POI grid point weights $w_j$ of grid point $g(x_i,y_i)$ for each $POI_j$, $0 \le j \le N-1$. In some embodiments, cumulative grid point weight is computed as a product of individual POI grid point weights $w_j^{g(xi,yi)}$ of grid point $g(x_i,y_i)$ for each $POI_j$, $0 \le j \le N-1$. Accordingly, the cumulative grid point weight $W_{g(xi, yi)} = w_0^{g(xi,yi)} * w_1^{g(xi,yi)} * w_2^{g(xi,yi)} * \ldots * w_{N-1}^{g(xi,yi)}$.

Next, in step 545, the algorithm determines if there are additional points $g(x_i,y_i)$ on the visibility map that have not been assigned cumulative grid point weights. If there are additional grid points ("Y" in step 545), the counter i is incremented in step 548 and the algorithm returns to step 520 to begin another iteration for the next grid point $g(x_i,y_i)$. If there are no further grid points $g(x_i,y_i)$ ("N" in step 545), the algorithm proceeds to step 550, where the location of the MS may be estimated as $$loc(X) = \frac{\sum_{i=1}^{M} x_i W_i}{\sum_{i=1}^{M} W_i} \text{ and } loc(Y) = \frac{\sum_{i=1}^{M} y_i W_i}{\sum_{i=1}^{M} W_i}$$

where $W_i$ is the cumulative grid point weight for grid point $g(x_i,y_i)$ on the visibility map and M is the total number of grid points. In step 550, the estimated location of the MS may be calculated as (loc(X), loc(Y)), and the method may terminate in step 555.

Figure 6:
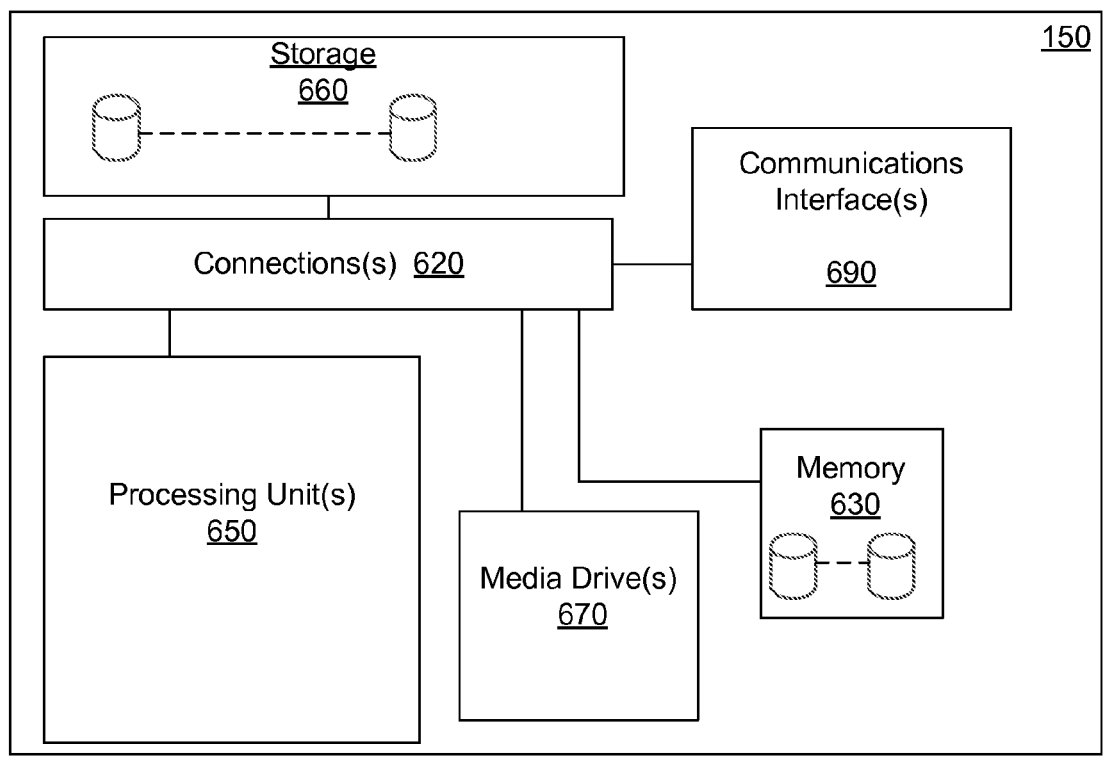
FIG. 6 shows a schematic block diagram illustrating exemplary server enabled to perform robust position estimation using landmark based positioning techniques in a manner consistent with disclosed embodiments.

FIG. 6 shows a schematic block diagram illustrating exemplary server 150 enabled to perform robust position estimation using landmark based positioning techniques in a manner consistent with disclosed embodiments. In some embodiments, server 150 may be wirelessly coupled to one or more mobile stations 110 over a wireless network, which may one of a WWAN, WLAN or WPAN. In some embodiments, server 150 may include, for example, one or more processing units 650, memory 630, storage 660, and (as applicable) communications interfaces 690 (e.g., wireline and/or wireless network interfaces). The functional units listed above as well as other functional units may be operatively coupled with one or more connections 620 (e.g., buses, lines, fibers, links, etc.). In certain example implementations, some portion of server 150 may take the form of a chipset, and/or the like.

Communications interfaces 690 may include a variety of wired and/or wireless connections that support wired transmission and/or reception and, if desired, may additionally or alternatively support transmission and reception of one or more signals over one or more types of wireless communication networks. Communications interfaces 690 may also include interfaces for communication with various other computers and peripherals. For example, in one embodiment, Communications interfaces 690 may comprise network interface cards, input-output cards, chips and/or ASICs that implement one or more of the communication functions performed by server 150. Further, server 150 may receive MS related information including estimates of the location of MS 110 such as the last known/most recent location, requests for location assistance, images of POIs captured by MS 110, etc. and/or may also retrieve POI related information from websites through communications interfaces 690. For example, in some embodiments, communications interface(s) 690 may be configured to receive the captured images of each POI in the subset from a mobile station. In some embodiments, server 150 may use communications interface 690 to send POI related information, including POI databases, location assistance information, position estimates etc. to MS 110. In general, communications interfaces 690 may be used to send and receive data, control, management, and configuration information to one or more mobile stations.

Processing unit(s) 650 may be implemented using a combination of hardware, firmware, and software. In some embodiments, processing units 650 may include a landmark based position determination module and/or a location assistance module (not shown) to facilitate landmark based location determination of MS 110, and/or to provide location assistance information, respectively. For example, in one embodiment, if location determination is being performed by MS 110 or another network entity, server 150 may provide POI related information, including POI databases, as location assistance information. In one embodiment, server 150 may use landmark based position determination module to implement some portion of methods 485 and/or 500. In some embodiments, the functionality in exemplary methods 485 and 500 may be combined in to a single module. Processing units 650 may also be capable of processing various other types of information such as performing image processing, running SIFT or other image matching algorithms to match POIs in images captured by MS 110 with images of POIs stored on server 150, either directly or in conjunction with one or more other functional blocks shown in FIG. 6. In some embodiments, processing unit(s) 650 may represent one or more circuits configurable to perform at least a portion of a data signal computing procedure or process related to the operation of server 150.

The methodologies described herein in flow charts and message flows may be implemented by various means depending upon the application. For example, these methodologies may be implemented in hardware, firmware, software, or any combination thereof. For a hardware implementation, the processing units 650 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in media drive 670, which may support the use of non-transitory computer-readable media, including removable media. Program code may be resident on non-transitory computer readable media or memory 530 and may be read and executed by processor unit(s) 650. Memory may be implemented within processing units 650 or external to processing units 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium and/or memory 630. Examples include computer-readable media encoded with a data structure and computer-readable media encoded with a computer program. For example, non-transitory computer-readable medium including program code stored thereon may include program code to support robust position estimation using landmark based positioning and/or to provide location assistance to MS 110 in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interfaces 690, which may store the instructions/data in memory 630, storage 660 and/or relay the instructions/data to processing units 650 for execution. For example, communications interfaces 690 may receive wireless or network signals indicative of instructions and data. The instructions and data may cause one or more processing units 650 to be configured to implement one or more functions outlined in the claims. That is, the communication apparatus includes transmission media with signals indicative of information to perform disclosed functions.

Memory 630 may represent any data storage mechanism. Memory 630 may include, for example, a primary memory and/or a secondary memory. Primary memory may include, for example, a random access memory, read only memory, non-volatile RAM, etc. While illustrated in this example as being separate from processing units 650, it should be understood that all or part of a primary memory may be provided within or otherwise co-located/coupled with processing units 650. Secondary memory may include, for example, the same or similar type of memory as primary memory and/or storage 660 such as one or more data storage devices or systems 660 including, for example, hard disk drives, optical disc drives, tape drives, a solid state memory drive, etc. In some embodiments, storage 660 and/or memory 630 may comprise one or more databases that may hold information pertaining to various POI entities for locations served by server 150. In some embodiments, POI related information may include images of the POIs, locations of the POIs, POI features for SIFT or other image matching algorithms, visibility maps for the POIs, etc. In some embodiments, information in the databases may be read, used and/or updated by processing units 650 during various computations, including methods for landmark based robust mobile station position estimation, for generating location assistance data, and/or for computing estimated locations of mobile stations 110, etc.

In certain implementations, secondary memory may be operatively receptive of, or otherwise configurable to couple to a non-transitory computer-readable medium in media drive 670. As such, in certain example implementations, the methods and/or apparatuses presented herein may take the form in whole or part of a media drive 670 that may include non-transitory computer readable medium with computer implementable instructions stored thereon, which if executed by at least one processing unit 352 may be operatively enabled to perform all or portions of the example operations as described herein.

What is claimed is:

1. A processor-implemented method for estimating a position of a mobile station (MS) the method comprising:
    identifying a subset of points of interest in a plurality of points of interest by matching MS captured images of each point of interest in the subset of points of interest with at least one corresponding stored image of a point of interest selected from images of the plurality of points of interest, each point of interest in the subset of points of interest being associated with a corresponding visibility map comprising a set of grid points;
    computing a corresponding cumulative grid point weight for each grid point based on corresponding individual grid point weights, each individual grid point weight associated with one of the points of interest in the subset of points of interest; and
    computing an estimated location of the MS based on the corresponding cumulative grid point weight of each grid point.

2. The processor implemented method of claim 1, wherein the corresponding cumulative grid point weight for each grid point is computed as a function of the corresponding individual grid point weights, each corresponding individual grid point weight associated with a point of interest in the subset of points of interest.

3. The processor implemented method of claim 1, wherein computing the corresponding cumulative grid point weight for each grid point comprises:
    determining an area of intersection of visibility maps associated with the subset of the points of interest; and
    computing the cumulative grid point weight for each grid point lying within the area of intersection of the visibility maps.

4. The processor implemented method of claim 1, wherein the MS is in a line of sight of each point of interest in the subset of points of interest.

5. The processor implemented method of claim 1, wherein each individual grid point weight of the corresponding individual grid point weights for a grid point corresponds to a distinct point of interest in the subset of points of interest and represents a probability relative to the corresponding point of interest that the MS is located at that grid point.

6. The processor implemented method of claim 5, wherein each individual grid point weight is based, in part, on a distance of the grid point from the corresponding point of interest.

7. The processor implemented method of claim 5, wherein each individual grid point weight is based, in part, on a viewing angle of the grid point relative to the corresponding point of interest.

8. The processor implemented method of claim 5, wherein each individual grid point weight is based on at least one of:
    a distance ($dist(g(x, y), POI_j)$) and a viewing angle ($\alpha_j^{g(x, y)}$) of the grid point ($g(x,y)$) from the corresponding point of interest ($POI_j$) relative to a first distance ($d0_j$) and a first view angle ($\alpha 0_j$) for viewing the corresponding point of interest ($POI_j$), respectively; or
    an estimated pose of the MS relative to the corresponding point of interest ($POI_j$) and a confidence interval associated with the estimated pose of the MS; or
    a history based on compiled information, the compiled information based, in part, on the at least one corresponding stored image associated with the corresponding point of interest ($POI_j$).

9. The processor implemented method of claim 2, wherein the function to compute the corresponding cumulative grid point weight for each grid point obtains, for each grid point, the corresponding cumulative grid point weight as a product of the corresponding individual grid point weights.

10. The processor implemented method of claim 8, wherein each individual grid point weight is computed using the estimated pose of the MS relative to the corresponding point of interest, if the confidence interval associated with the estimated pose of the MS exceeds a confidence interval threshold.

11. The processor implemented method of claim 8, wherein the estimated pose of the MS relative to the corresponding point of interest and the confidence interval associated with the estimated pose of the MS are based on the MS captured images.

12. The processor implemented method of claim 8, wherein each corresponding individual grid point weight ($w_j^{g(x,y)}$) is computed as a product of a distance component ($w\_d_j^{g(x,y)}$) and an angular component ($w\_\alpha_j^{g(x,y)}$) of the corresponding individual grid point weight ($w_j^{g(x,y)}$).

13. The processor implemented method of claim 1, wherein the cumulative grid point weight for each grid point represents a probability that the MS is located at that grid point.

14. The processor implemented method of claim 1, wherein the method is performed by the MS.

15. The processor implemented method of claim 1, wherein the method is performed by a server.

16. The processor implemented method of claim 1, wherein matching the MS captured images of each point of interest in the subset of points of interest with the at least one corresponding stored image of the point of interest comprises:
matching the MS captured images with the at least one corresponding stored image of the point of interest based, in part, on Scale Invariant Feature Transform (SIFT) techniques.

17. An apparatus comprising:
a memory configured to store images of a plurality of points of interest and visibility maps wherein each visibility map is associated with a point of interest in the subset and comprises a set of grid points; and
a processor coupled to the memory, the processor configured to:
identify a subset of points of interest in the plurality of points of interest by matching Mobile Station (MS) captured images of each point of interest in the subset of points of interest with at least one corresponding stored image of a point of interest selected from the images of the plurality of points of interest stored in the memory;
compute a corresponding cumulative grid point weight for each grid point based on corresponding individual grid point weights, each individual grid point weight associated with one of the points of interest in the subset of points of interest; and
compute an estimated location of the MS based on the corresponding cumulative grid point weight of each grid point.

18. The apparatus of claim 17, wherein to compute the cumulative grid point weight for each grid point, the processor is configured to:
compute the cumulative grid point weight for each grid point as a function of the corresponding individual grid point weights, each corresponding individual grid point weight associated with a point of interest in the subset of points of interest.

19. The apparatus of claim 17, wherein to compute the cumulative grid point weight for each grid point, the processor is configured to:
determine an area of intersection of visibility maps associated with the subset of points of interest; and
compute the cumulative grid point weight for each grid point lying within the area of intersection of the visibility maps.

20. The apparatus of claim 17, wherein each individual grid point weight of the corresponding individual grid point weights corresponds to a distinct point of interest in the subset of points of interest and represents a probability relative to the corresponding point of interest that the MS is located at that grid point.

21. The apparatus of claim 20, wherein the processor is configured to determine each individual grid point weight based, in part, on a distance of the grid point from the corresponding point of interest.

22. The apparatus of claim 20, wherein the processor is configured to determine each individual grid point weight based, in part, on a viewing angle of the grid point relative to the corresponding point of interest.

23. The apparatus of claim 20, wherein the processor is configured to determine each individual grid point weight based on at least one of:
a distance ($dist(g(x,y), POI_j)$) and a viewing angle ($\alpha_j^{g(x,y)}$) of the grid point ($g(x,y)$) from the corresponding point of interest ($POI_j$) relative to a first distance ($d0_j$) and a first view angle ($\alpha0_j$) for viewing the corresponding point of interest ($POI_j$), respectively; or an estimated pose of the MS relative to the corresponding point of interest ($POI_j$) and a confidence interval associated with the estimated pose of the MS; or
a history based on compiled information, the compiled information based, in part, on the at least one corresponding stored image associated with the corresponding point of interest ($POI_j$).

24. The apparatus of claim 18, wherein the function to compute the corresponding cumulative grid point weight for each grid point obtains, for each grid point, the corresponding cumulative grid point weight as a product of the corresponding individual grid point weights.

25. The apparatus of claim 23, wherein the processor is configured to determine each individual grid point weight by using the estimated pose of the MS relative to the corresponding point of interest, if the confidence interval associated with the estimated pose of the MS exceeds a confidence interval threshold.

26. The apparatus of claim 24, wherein the processor is configured to determine the estimated pose of the MS relative to the corresponding point of interest and the confidence interval associated with the estimated pose of the MS based on the MS captured images.

27. The apparatus of claim 24, wherein the processor is configured to compute each corresponding individual grid point weight ($w_j^{g(x,y)}$) as a product of a distance component ($w\_d_j^{g(x,y)}$) and an angular component ($w\_\alpha_j^{g(x,y)}$) of the corresponding individual grid point weight ($w_j^{g(x,y)}$).

28. The apparatus of claim 17, wherein the cumulative grid point weight for each grid point represents a probability that the MS is located at that grid point.

29. The apparatus of claim 17, wherein the apparatus is a mobile station (MS) and further comprises a camera, the camera configured to capture the images of each point of interest in the subset.

30. The apparatus of claim 17, wherein the apparatus further comprises a communications interface configured to receive the captured images of each point of interest in the subset from the mobile station.

31. The apparatus of claim 17, wherein to match the MS captured images of each point of interest in the subset of points of interest with the at least one corresponding stored image of the point of interest, the processor is configured to:
match the MS captured images with the at least one corresponding stored image of the point of interest based, in part, on Scale Invariant Feature Transform (SIFT) techniques.

32. An apparatus comprising:
means for storing images of a plurality of points of interest and visibility maps, wherein each visibility map is associated with a point of interest in the subset, wherein each visibility map comprises a set of grid points;
means for identifying a subset of points of interest in the plurality of points of interest by matching Mobile Station (MS) captured images of each point of interest in the subset with at least one corresponding stored image of a point of interest selected from stored images of the plurality of points of interest;
means for computing a corresponding cumulative grid point weight for each grid point based on corresponding individual grid point weights, each individual grid point weight associated with one of the points of interest in the subset of points of interest; and
means for computing an estimated location of the MS based on the corresponding cumulative grid point weight of each grid point.

33. The apparatus of claim 32, wherein the means for computing the corresponding cumulative grid point weight for each grid point computes the corresponding cumulative grid point weight for each grid point as a function of the corresponding individual grid point weights, each corresponding individual grid point weight associated with a point of interest in the subset of points of interest.

34. The apparatus of claim 32, further comprising the means for computing the cumulative grid point weight for each grid point comprises:
  means for determining an area of intersection of visibility maps associated with the subset of points of interest; and
  means for computing the cumulative grid point weight for each grid point lying within the area of intersection of the visibility maps.

35. The apparatus of claim 32, wherein means for computing a corresponding cumulative grid point weight comprises:
  means for determining each individual grid point weight of the corresponding individual grid point weights for a grid point corresponds to a distinct point of interest in the subset of points of interest and represents a probability relative to the corresponding point of interest that the MS is located at that grid point.

36. The apparatus of claim 35, wherein the means for determining each individual grid point weight of the corresponding individual grid point weights determines each individual grid point weight based, in part, on a distance of the grid point from the corresponding point of interest.

37. The apparatus of claim 35, wherein the means for determining each individual grid point weight of the corresponding individual grid point weights determines each individual grid point weight based, in part, on a viewing angle of the grid point relative to the corresponding point of interest.

38. The apparatus of claim 35, wherein the means for determining each individual grid point weight of the corresponding individual grid point weights determines each individual grid point weight based on at least one of:
  a distance ($dist(g(x, y), POI_j)$) and a viewing angle ($\alpha_j^{g(x,y)}$) of the grid point ($g(x,y)$) from the corresponding point of interest ($POI_j$) relative to a first distance ($d0_j$) and a first view angle ($\alpha 0_j$) for viewing the corresponding point of interest ($POI_j$), respectively; or
  an estimated pose of the MS relative to the corresponding point of interest ($POI_j$) and a confidence interval associated with the estimated pose of the MS; or
  a history based on compiled information the compiled information based, in part, on the at least one corresponding stored image associated with the corresponding point of interest ($POI_j$).

39. The apparatus of claim 33, wherein the function to compute the corresponding cumulative grid point weight for each grid point obtains, for each grid point, the corresponding cumulative grid point weight as a product of the corresponding individual grid point weights.

40. The apparatus of claim 38, wherein the means for determining each corresponding individual grid point weight of the corresponding individual grid point weights determines each individual grid point weight based on an estimated pose of the MS relative to the corresponding point of interest, if the confidence interval associated with the estimated pose of the MS exceeds a confidence interval threshold.

41. The apparatus of claim 38, the estimated pose of the MS relative to the corresponding point of interest and the confidence interval associated with the estimated pose of the MS are based on the MS captured images.

42. The apparatus of claim 38, wherein the means for determining each corresponding individual grid point weight ($w_j^{g(x,y)}$) for each point of interest in the subset comprises:
  means for computing a product of a distance component ($w\_d_j^{g(x,y)}$) and an angular component ($w\_\alpha_j^{g(x,y)}$) of the corresponding individual grid point weight ($w_j^{g(x,y)}$) relative to the corresponding point of interest ($POI_j$).

43. The apparatus of claim 32, wherein the cumulative grid point weight for each grid point represents a probability that the MS is located at that grid point.

44. The apparatus of claim 32, further comprising image capturing means, the image capturing means to capture the MS captured images of each point of interest in the subset.

45. The apparatus of claim 32, further comprising means for communicating, the means for communicating to receive the captured images of each point of interest in the subset.

46. The apparatus of claim 32, wherein matching the MS captured images of each point of interest in the subset of points of interest with the at least one corresponding stored image of the point of interest comprises: matching the MS captured images with the at least one corresponding stored image of the point of interest based, in part, on Scale Invariant Feature Transform (SIFT) techniques.

47. A non-transitory computer-readable medium comprising instructions, which when executed by a processor, cause the processor to:
  identify a subset of points of interest in a plurality of points of interest by matching Mobile Station (MS) captured images of each point of interest in the subset of points of interest with at least one corresponding stored image of a point of interest selected from images of the plurality of points of interest, each point of interest being associated with a corresponding visibility map comprising a set of grid points;
  compute a corresponding cumulative grid point weight for each grid point based on corresponding individual grid point weights, each individual grid point weight associated with one of the points of interest in the subset of points of interest; and
  compute an estimated location of the MS based on the corresponding cumulative grid point weight of each grid point.

48. The computer-readable medium of claim 47, wherein the corresponding cumulative grid point weight for each grid point is computed as a function of the corresponding individual grid point weights, each corresponding individual grid point weight associated with a point of interest in the subset of points of interest.

49. The computer-readable medium of claim 47, wherein computing the corresponding cumulative grid point weight for each grid point comprises:
  determining an area of intersection of visibility maps of the subset associated with the points of interest; and
  computing the cumulative grid point weight for each grid point lying within the area of intersection of the visibility maps.

50. The computer-readable medium of claim 47, wherein the MS is in a line of sight of each point of interest in the subset of points of interest.

51. The computer-readable medium of claim 47, wherein each individual grid point weight of the corresponding individual grid point weights for a grid point corresponds to a distinct point of interest in the subset of points of interest and represents a probability relative to the corresponding point of interest that the MS is located at that grid point.

52. The computer-readable medium of claim 51, wherein each individual grid point weight is based, in part, on a distance of the grid point from the corresponding point of interest.

53. The computer-readable medium of claim 51, wherein each individual grid point weight is based, in part, on a viewing angle of the grid point relative to the corresponding point of interest.

54. The computer-readable medium of claim 51, wherein each individual grid point weight is based on at least one of:
- a distance $(\text{dist}(g(x, y), \text{POI}_j))$ and a viewing angle $(\alpha_j^{g(x,y)})$ of the grid point $(g(x,y))$ from the corresponding point of interest $(\text{POI}_j)$ relative to a first distance $(d0_j)$ and a first view angle $(\alpha 0_j)$ for viewing the corresponding point of interest $(\text{POI}_j)$ respectively; or
- an estimated pose of the MS relative to the corresponding point of interest $(\text{POI}_j)$ and a confidence interval associated with the estimated pose of the MS; or
- a history based on compiled information, the compiled information based, in part, on the at least one corresponding stored image associated with the corresponding point of interest $(\text{POI}_j)$.

55. The computer-readable medium of claim 49, wherein the function to compute the corresponding cumulative grid point weight for each grid point obtains, for each grid point, the corresponding cumulative grid point weight as a product of the corresponding individual grid point weights.

56. The computer-readable medium of claim 54, wherein each individual grid point weight is computed using the estimated pose of the MS relative to the corresponding point of interest, if the confidence interval associated with the estimated pose of the MS exceeds a confidence interval threshold.

57. The computer-readable medium of claim 54, wherein the estimated pose of the MS relative to the corresponding point of interest and the confidence interval associated with the estimated pose of the MS are based on the MS captured images.

58. The computer-readable medium of claim 54, wherein each corresponding individual grid point weight $(w_j^{g(x,y)})$ is computed as a product of a distance component $(w\_d_j^{g(x,y)})$ and an angular component $(w\_\alpha_j^{g(x,y)})$ of the corresponding individual grid point weight $(w_j^{g(x,y)})$ relative to the corresponding point of interest $(\text{POI}_j)$.

59. The computer-readable medium of claim 47, wherein the cumulative grid point weight for each grid point represents a probability that the MS is located at that grid point.

60. The computer-readable medium of claim 47, wherein the method is performed by the MS.

61. The computer-readable medium of claim 47, wherein the method is performed by a server.

62. The computer-readable medium of claim 47, wherein matching the MS captured images of each point of interest in the subset of points of interest with the at least one corresponding stored image of the point of interest comprises:
- matching the MS captured images with the at least one corresponding stored image of the point of interest based, in part, on Scale Invariant Feature Transform (SIFT) techniques.

* * * * *